United States Patent
Han et al.

(10) Patent No.: US 10,346,726 B2
(45) Date of Patent: Jul. 9, 2019

(54) IMAGE RECOGNITION METHOD AND APPARATUS, IMAGE VERIFICATION METHOD AND APPARATUS, LEARNING METHOD AND APPARATUS TO RECOGNIZE IMAGE, AND LEARNING METHOD AND APPARATUS TO VERIFY IMAGE

(71) Applicant: Samsung Electronics Co., Ltd., Suwon-si, Gyeonggi-do (KR)

(72) Inventors: Seungju Han, Seoul (KR); Sungjoo Suh, Seoul (KR); Jaejoon Han, Seoul (KR); Chang Kyu Choi, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 277 days.

(21) Appl. No.: 14/958,030

(22) Filed: Dec. 3, 2015

(65) Prior Publication Data
US 2016/0171346 A1 Jun. 16, 2016

(30) Foreign Application Priority Data

Dec. 15, 2014 (KR) .................. 10-2014-0180213
Oct. 1, 2015 (KR) .................. 10-2015-0138491

(51) Int. Cl.
*G06K 9/00* (2006.01)
*G06K 9/46* (2006.01)
(Continued)

(52) U.S. Cl.
CPC ........... *G06K 9/66* (2013.01); *G06K 9/00624* (2013.01); *G06K 9/4604* (2013.01);
(Continued)

(58) Field of Classification Search
CPC .. G06N 3/0454; G06N 3/084; G06K 9/00275; G06K 9/00288; G06K 9/00624;
(Continued)

(56) References Cited

U.S. PATENT DOCUMENTS 5,774,633 A 6/1998 Baba et al.
6,038,338 A 3/2000 Nguyen
(Continued)

FOREIGN PATENT DOCUMENTS

KR 1999-0052660 A 7/1999
KR 2005-0043869 A 5/2005
(Continued)

OTHER PUBLICATIONS

Song et al. "Context-aided human recognition-clustering." European Conference on Computer Vision. Springer, Berlin, Heidelberg, 2006.*
(Continued)

*Primary Examiner* — Katrina R Fujita
(74) *Attorney, Agent, or Firm* — Harness, Dickey & Pierce, P.L.C.

(57) ABSTRACT

A method of recognizing a feature of an image may include receiving an input image including an object; extracting first feature information using a first layer of a neural network, the first feature information indicating a first feature corresponding to the input image among a plurality of first features; extracting second feature information using a second layer of the neural network, the second feature information indicating a second feature among a plurality of second features, the indicated second feature corresponding to the first feature information; and recognizing an element corresponding to the object based on the first feature information and the second feature information.

30 Claims, 19 Drawing Sheets

(51) Int. Cl.
*G06K 9/48* (2006.01)
*G06K 9/62* (2006.01)
*G06K 9/66* (2006.01)
*G06N 3/04* (2006.01)
*G06N 3/08* (2006.01)

(52) U.S. Cl.
CPC .............. *G06K 9/4628* (2013.01); *G06K 9/48* (2013.01); *G06K 9/6202* (2013.01); *G06K 9/627* (2013.01); *G06N 3/0454* (2013.01); *G06K 9/00275* (2013.01); *G06K 9/00288* (2013.01); *G06N 3/084* (2013.01)

(58) Field of Classification Search
CPC ...... G06K 9/4604; G06K 9/4628; G06K 9/48; G06K 9/6202; G06K 9/627; G06K 9/66
See application file for complete search history.

(56) References Cited

U.S. PATENT DOCUMENTS

| | | | |
|---|---|---|---|
| 7,788,196 | B2 | 8/2010 | Buscema |
| 8,386,401 | B2 | 2/2013 | Virkar et al. |
| 8,615,476 | B2 | 12/2013 | Berger et al. |
| 9,330,171 | B1* | 5/2016 | Shetty ............... G06F 17/30784 |
| 9,400,955 | B2* | 7/2016 | Garimella ............... G06N 3/082 |
| 9,530,047 | B1* | 12/2016 | Tang ................. G06K 9/00288 |
| 2010/0321229 | A1* | 12/2010 | Dwelly ................... G01S 7/415 342/28 |
| 2013/0290222 | A1* | 10/2013 | Gordo .................. G06K 9/6259 706/12 |
| 2014/0180989 | A1* | 6/2014 | Krizhevsky ........... G06N 3/063 706/31 |
| 2014/0229158 | A1 | 8/2014 | Zweig et al. |
| 2016/0117587 | A1* | 4/2016 | Yan ......................... G06N 3/08 706/20 |
| 2016/0180151 | A1* | 6/2016 | Philbin .............. G06K 9/00288 382/118 |

FOREIGN PATENT DOCUMENTS

| | | |
|---|---|---|
| KR | 10-0716376 B1 | 5/2007 |
| KR | 2012-0052610 A | 5/2012 |
| KR | 10-1254181 B1 | 4/2013 |
| WO | WO-2016-025189 A1 | 2/2016 |

OTHER PUBLICATIONS

Huang et al. "Large-scale learning with svm and convolutional for generic object categorization." Computer Vision and Pattern Recognition, 2006 IEEE Computer Society Conference on. vol. 1. IEEE, 2006. (Year: 2006).*
Jarrett et al. "What is the best multi-stage architecture for object recognition?." Computer Vision, 2009 IEEE 12th International Conference on. IEEE, 2009. (Year: 2009).*
Szegedy et al. "Going Deeper with Convolutions." arXiv preprint arXiv:1409.4842 (2014). (Year: 2014).*
Extended European Search Report for corresponding European Application No. 15198654.4 dated Jun. 1, 2016.
Sermanet et al., "Pedestrian Detection with Unsupervised Multi-Stage Feature Learning," 2013 IEEE Conference on Computer Vision and Pattern Recognition, Jun. 23, 2013, p. 3626-3633, IEEE Computer Society, XP032492965.
Raiko et al., "Deep Learning Made Easier by Linear Transformations in Perceptrons," Proceedings of the 15th International Conference on Artificial Intelligence and Statistics (AISTATS), Apr. 21, 2012, p. 924-932, vol. 22, XP 055274088.
Sun et al, "Hybrid Deep Learning for Face Verification," 2013 IEEE International Conference on Computer Vision, Dec. 1, 2013, p. 1489-1496, XP032573184.
Yim et al., "Image Classification Using Convolutional Neural Networks With Multi-stage Feature," Advances in Intelligent Systems and Computing , Robot Intelligence Technology and Applications 3, Nov. 6, 2014, p. 587-594, Springer International Publishing Switzerland, XP008180305.
Yang et al., "Multi-scale recognition with DAG-CNNs," May 20, 2015, p. 1-9, https://arxiv.org/pdf/1505.05232.pdf, XP055273929.
Chen et al., "Image Profiling for History Events on the Fly," Multimedia, ACM, Oct. 13, 2015, p. 291-300, XP058076435.
Zeiler et al., "Visualizing and Understanding Convolutional Networks," Correct System Design, Sep. 6, 2014, p. 818-833, Springer International Publishing Switzerland, XP055274509.

* cited by examiner

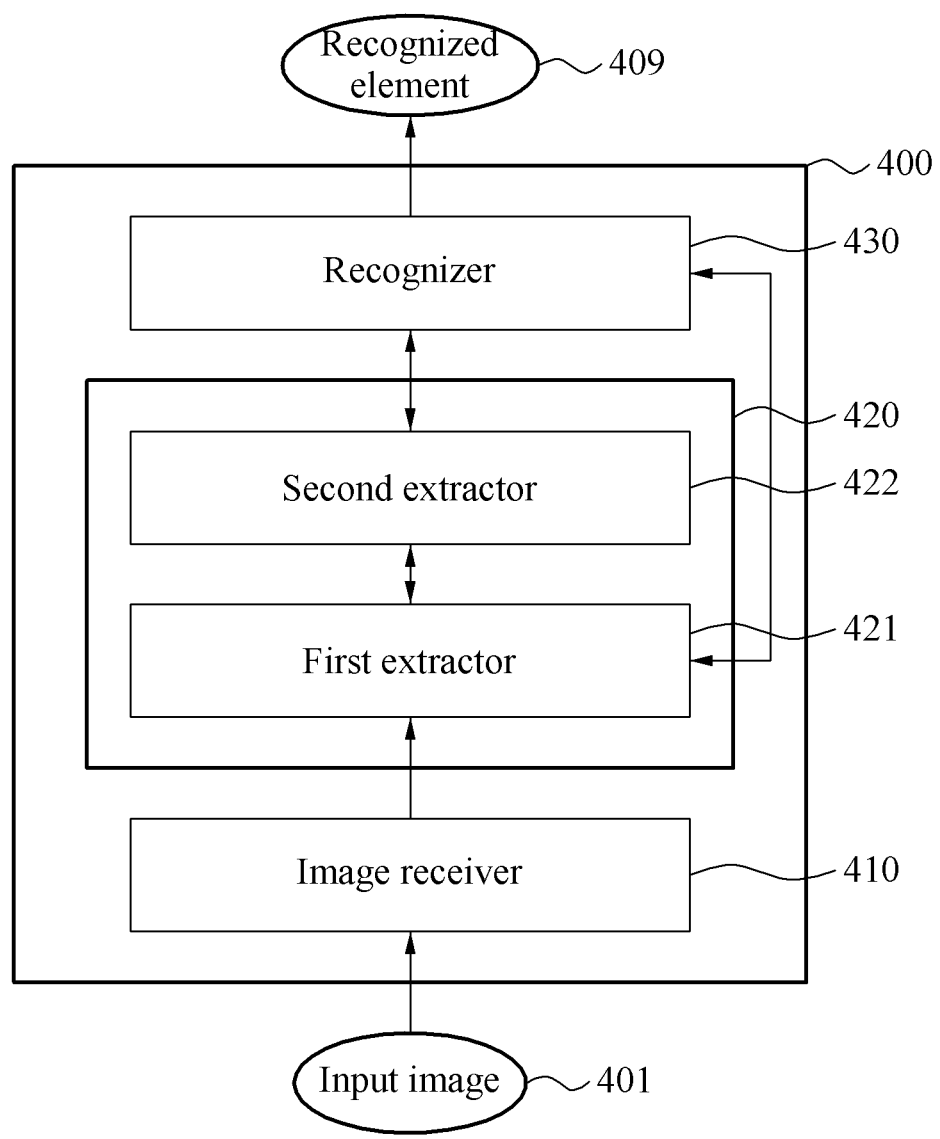

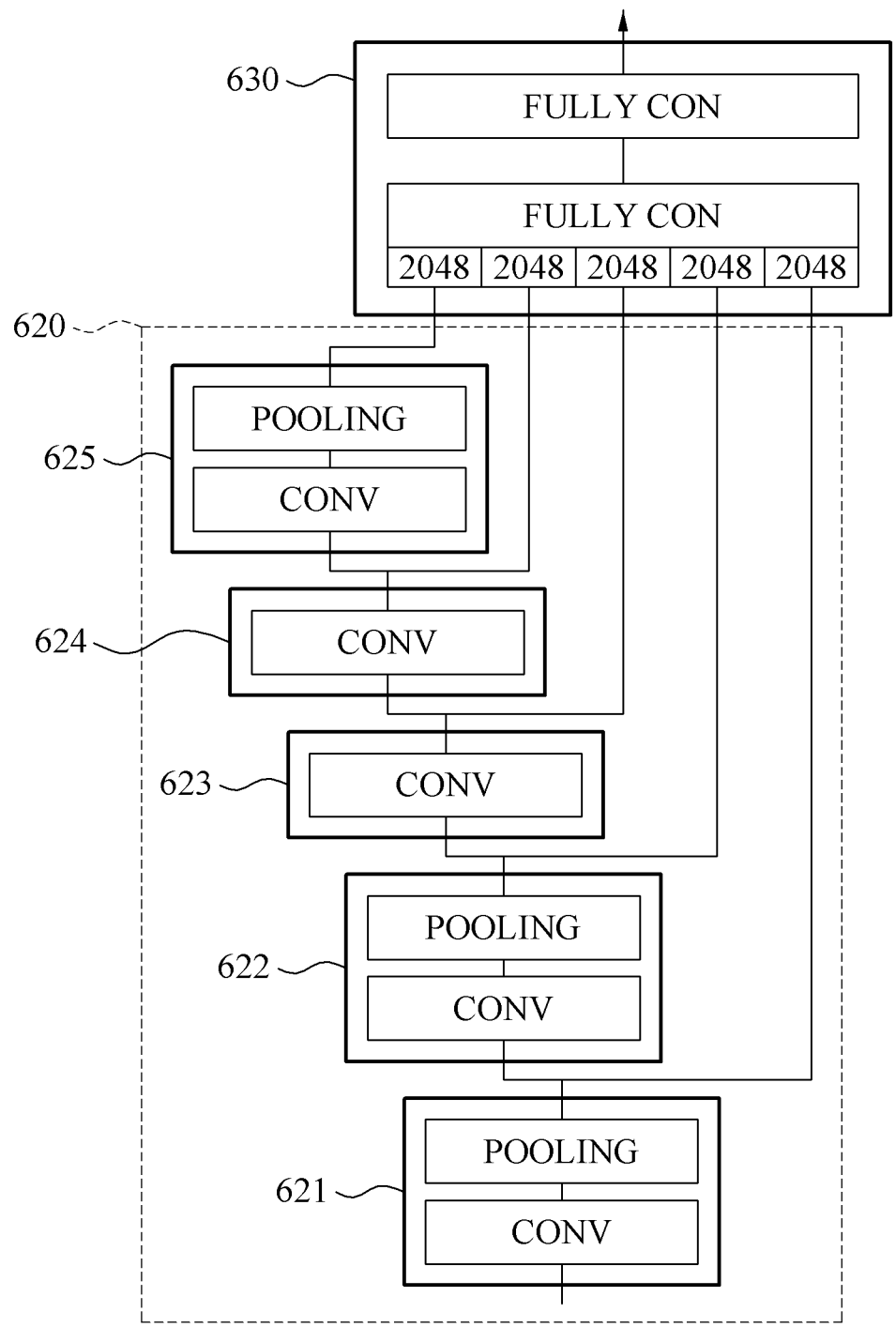

IMAGE RECOGNITION METHOD AND APPARATUS, IMAGE VERIFICATION METHOD AND APPARATUS, LEARNING METHOD AND APPARATUS TO RECOGNIZE IMAGE, AND LEARNING METHOD AND APPARATUS TO VERIFY IMAGE

CROSS-REFERENCE TO RELATED APPLICATION

This application claims the priority benefit of Korean Patent Application No. 10-2014-0180213 and Korean Patent Application No. 10-2015-0138491, respectively filed on Dec. 15, 2014 and Oct. 1, 2015, in the Korean Intellectual Property Office, the entire contents of each of which are incorporated herein by reference.

BACKGROUND

1. Field

At least one example embodiment relates to an object recognition method and apparatus, and a recognizer learning method and apparatus.

2. Description of the Related Art

In a transition to the 21st century information society, information on particular organizations and personal information may have significant importance. To protect the above important information, various types of passwords are used, and other technologies for verifying identity are desperately desired. Among these technologies, face recognition technologies have been evaluated as the most convenient and competitive identity verification methods because a user does not need to take a particular motion or action, and moreover a user's identity can be verified while the user does not recognize it.

Currently, a face recognition technology including recognizing a face by applying a principal component analysis (PCA) to a face image is being used frequently. The PCA refers to a scheme of projecting image data onto a low-dimensional eigenvector space while reducing or, alternatively, minimizing a loss of unique information of an image so as to reduce information. A method of extracting a principal feature vector of a face and recognizing the face using a pattern classifier learned using a principal component vector extracted from a preregistered image has been used frequently as a face recognition method using the PCA. However, by using the method to recognize a face with a large amount of information, a recognition speed and reliability may be reduced, and a satisfactory face recognition result may not be obtained in a change in a pose or a facial expression, even though a feature robust against illumination is obtained based on a selection of a PCA basis vector.

A face recognition performance varies depending on a performance of a pattern classifier to distinguish a registered face from an unregistered face. To learn the pattern classifier, an artificial neural network may be used.

SUMMARY

According to at least some example embodiments, a method of recognizing a feature of an image includes receiving an input image including an object; extracting first feature information using a first layer of a neural network, the first feature information indicating a first feature corresponding to the input image among a plurality of first features; extracting second feature information using a second layer of the neural network, the second feature information indicating a second feature among a plurality of second features, the indicated second feature corresponding to the first feature information; and recognizing an element corresponding to the object based on the first feature information and the second feature information.

According to at least some example embodiments, an apparatus for recognizing a feature of an image includes a memory storing computer-readable instructions; and one or more processors configured to: execute the computer-readable instructions such that the one or more processors are configured to, receive an input image including an object; extract first feature information using a first layer, the first feature information indicating a first feature among a plurality of first feature information, the indicated first feature corresponding to the input image; extract second feature information using a second layer, the second feature information indicating a second feature among a plurality of second features, the indicated second feature corresponding to the first feature information; and recognize an element corresponding to the object based on the first feature information and the second feature information.

According to at least some example embodiments, a method of learning a feature to recognize an image includes receiving a training element and a training image associated with a training object; and learning a parameter of a recognizer such that the recognizer recognizes the training element from the training image, the recognizer being configured to recognize a plurality of elements from first feature information extracted from an input image using a first layer of a neural network and second feature information extracted using a second layer of the neural network.

According to at least some example embodiments, an apparatus for learning a feature to recognize an image includes a memory storing computer-readable instructions; and one or more processors configured to execute the computer-readable instructions such that the one or more processors are configured to: receive a training element and a training image associated with a training object; implement a recognizer; and learn a parameter of the recognizer such that the recognizer recognizes the training element from the training image, the recognizer being configured to recognize a plurality of elements from first feature information extracted from an input image using a first layer of a neural network and second feature information extracted using a second layer of the neural network.

According to at least some example embodiments, a method of verifying a feature of an image may include receiving a first age including a first object; extracting first feature information using a first layer of a neural network, the first feature information indicating a first feature among a plurality of first features, the indicated first feature corresponding to the first image; extracting second feature information using a second layer of the neural network, the second feature information indicating a second feature among a plurality of second features, the indicated second feature corresponding to the first feature information; and determining whether the object of the first image is similar to a second object of a second image, based on the first feature information and the second feature information of the first image and based on first feature information and second feature information associated with the second image.

According to at least some example embodiments, an apparatus for verifying a feature of an image includes a memory storing computer-readable instructions; an one or more processors configured to execute the computer readable instructions such that the one or more processors are configured to: receive a first image including a first object; extract first feature information using a first layer of a neural network, the first feature information indicating a first feature among a plurality of first features, the first feature corresponding to the first image; extract second feature information using a second layer of a neural network, the second feature information indicating a second feature among a plurality of second features, the second feature corresponding to the first feature information among; and determine whether the first object is similar to a second object of a second image, based on the first feature information and the second feature information of the first image and based on first feature information and second feature information associated with the second image.

According to at least some example embodiments, a method of learning a feature to verify an image includes receiving a pair of training images, and training information corresponding to the pair of training images; and learning a parameter of a verifier so that a result of comparing, by the verifier, the training images corresponds to the training information; the verifier being configured to determine whether two input images are similar to each other, based on first feature information extracted from the two input images using a first layer of a neural network and based on second feature information extracted using a second layer of the neural network.

According to at least some example embodiments, an apparatus for learning a feature to verify an image includes a memory storing computer-readable instructions; and one or more processors configured to execute the computer-readable instructions such that the one or more processors are configured to: receive a pair of training images, and training information corresponding to the pair of training images, and learn a parameter of a verifier so that a result of comparing, by the verifier, the training images corresponds to the training information, the verifier being configured to determine whether two input images are similar to each other, based on first feature information extracted from the two input images using a first layer of a neural network and based on second feature information extracted using a second layer of the neural network.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 4 is a block diagram illustrating a configuration of an apparatus for recognizing a feature of an image according to at least one example embodiment;

FIG. 6 is a block diagram illustrating a configuration of a feature extractor and a recognizer in an apparatus for recognizing a feature of an image according to at least one example embodiment;

DETAILED DESCRIPTION

Figure 1:
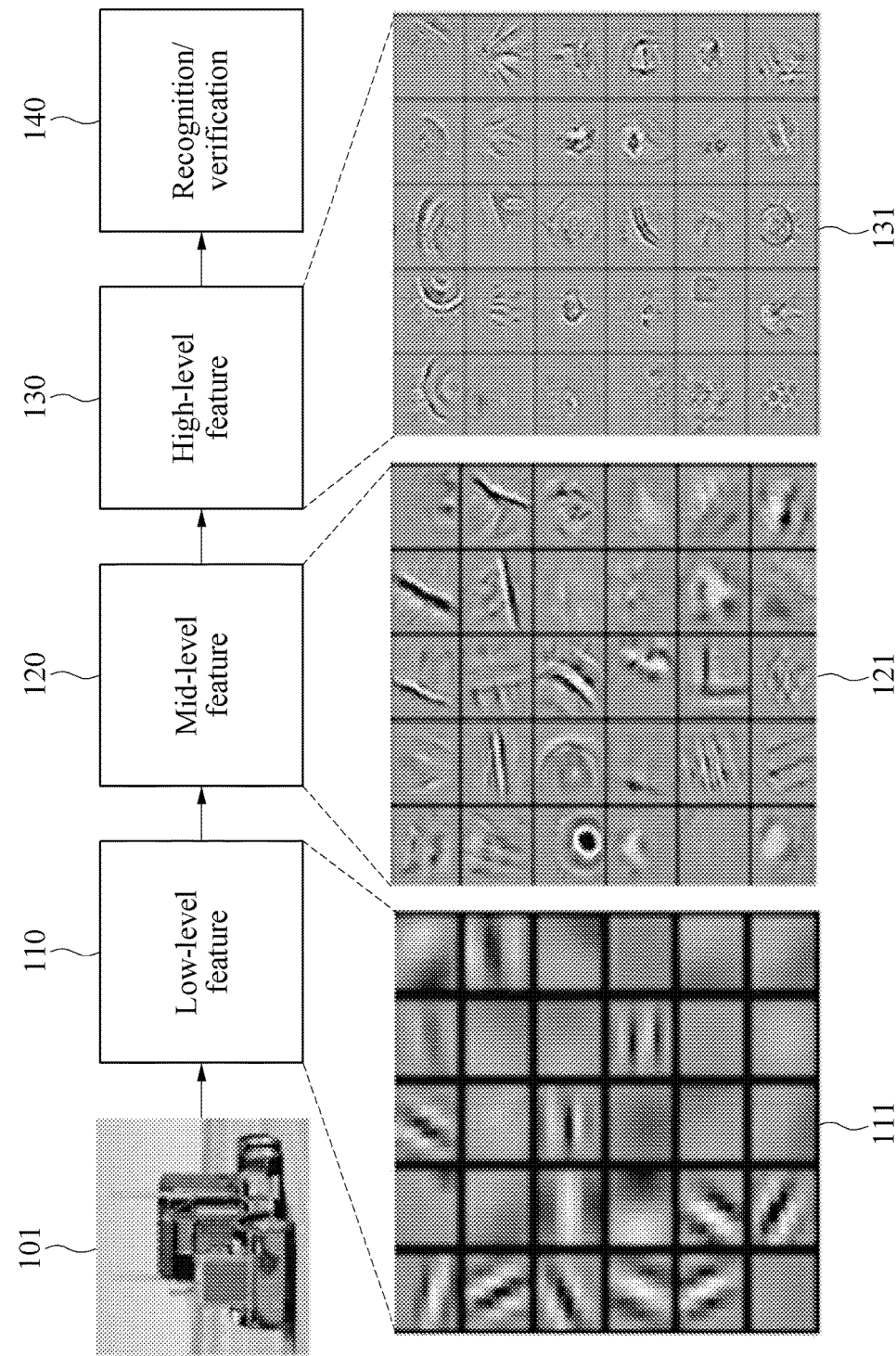
FIG. 1 illustrates a structure to recognize and verify an input image by performing an abstraction of the input image using a low-level feature, a mid-level feature and a high-level feature according to a related art.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Hereinafter, in the present disclosure, deep learning refers to a set of algorithms in machine learning that attempt to model high-level abstractions using a combination of multiple non-linear transformations. The deep learning may be, for example, machine learning to train a computer to recognize a human way of thinking. The abstractions refer to a process of extracting core data from data.

Figure 2:
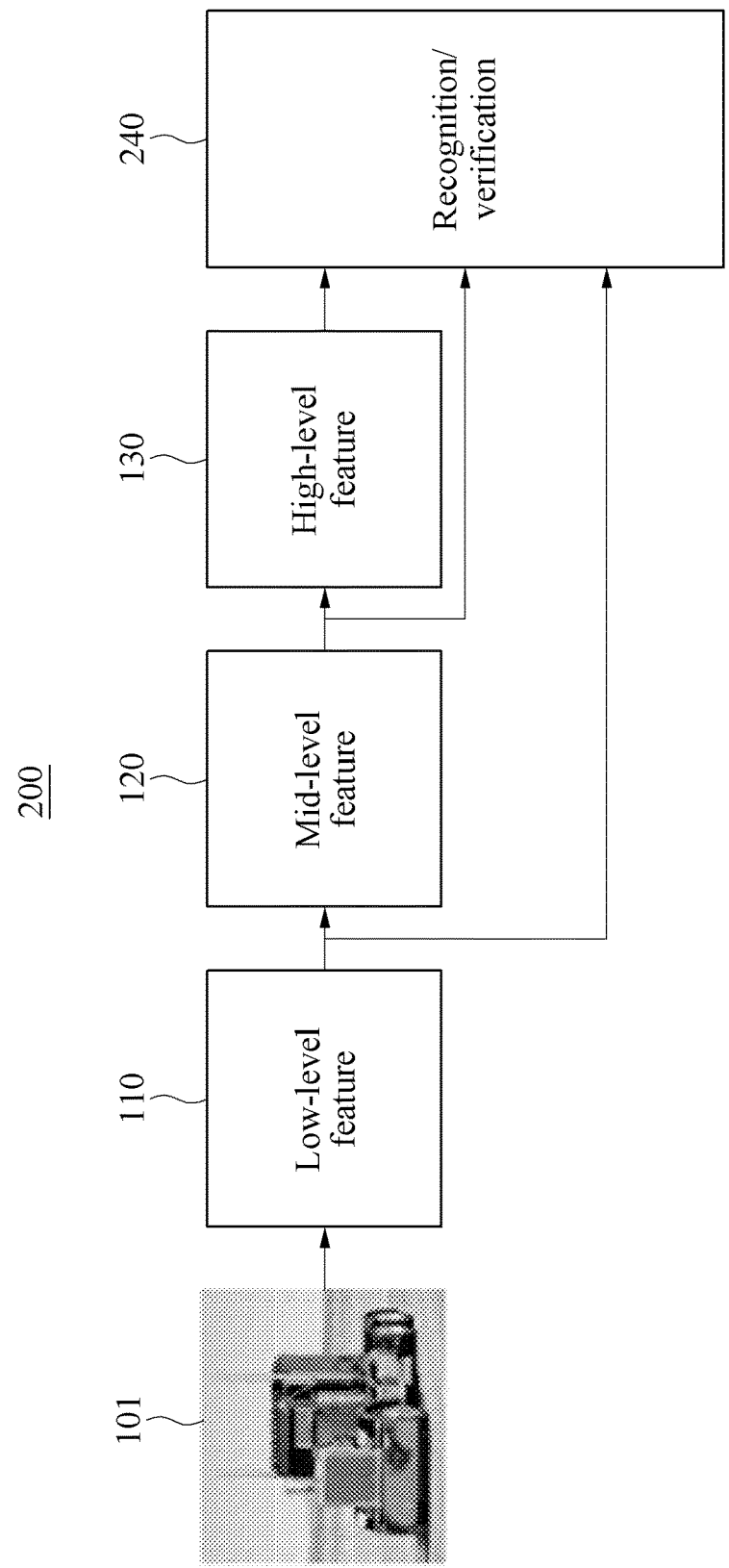
FIG. 2 illustrates a structure to recognize and verify an input image by performing an abstraction of the input image using a low-level feature, a mid-level feature and a high-level feature according to at least one example embodiment.

FIG. 1 illustrates a structure to recognize and verify an input image by performing an abstraction of the input image using a low-level feature, a mid-level feature and a high-level feature according to a related art. FIG. 2 illustrates a structure to recognize and verify an input image by performing an abstraction of the input image using a low-level feature, a mid-level feature and a high-level feature according to at least one example embodiment.

A deep learning structure 100 of FIG. 1 may perform an abstraction of an input image 101 by sequentially using features corresponding to a plurality of levels. For example, the deep learning structure 100 may perform the abstraction of the input image 101 using a low-level feature 110, a mid-level feature 120, and a high-level feature 130. According to at least one example embodiment of the inventive concepts, the deep learning structure 100 may be implemented by hardware, one or more processors executing computer-readable code, or a combination of the above-referenced hardware and processors executing computer-readable code, as will be discussed in greater detail at the end of the disclosure.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

A feature may be core data learned through an abstraction of data (for example, training images). In the present disclosure, a feature may include, for example, a feature image learned through an abstraction of an arbitrary image. The feature image may be learned as an image generated by performing a convolution filtering of a training image using a predetermined or, alternatively, desired number of filters with a predetermined or, alternatively, desired size. A number of learned feature images may correspond to the predetermined or, alternatively, desired number of the filters.

For example, the low-level feature 110 may be represented based on one of low-level feature images 111, the mid-level feature 120 may be represented based on one of mid-level feature images 121, and the high-level feature 130 may be represented based on one of high-level feature images 131. The low-level feature images 111 may be images learned by performing a convolution filtering of a training image, and the mid-level feature images 121 may be images learned by performing another convolution filtering of the low-level feature images 111. The high-level feature images 131 may be images learned by performing still another convolution filtering of the mid-level feature images 121.

A result of the abstraction of the input image 101 in the deep learning structure 100 may be represented as feature information indicating a feature corresponding to the input image 101 from features corresponding to each of the levels. The feature information may include, for example, a feature value indicating an arbitrary feature image. The deep learning structure 100 may extract feature information corresponding to each of a plurality of levels (e.g., low, mid and high levels) based on a pre-trained layer corresponding to each of the plurality of levels.

For example, the deep learning structure 100 may extract low-level feature information indicating the low-level feature 110 corresponding to the input image 101, may extract mid-level feature information indicating the mid-level feature 120 corresponding to the low-level feature information, and may extract high-level feature information indicating the high-level feature 130 corresponding to the mid-level feature information.

A recognition/verification module 140 in the deep learning structure 100 may perform a recognition and verification based on feature information of a last level, through sequential abstractions for each of the levels. For example, in FIG. 1, the recognition and verification may be performed based on only the high-level feature information indicating the high-level feature 130. In the example shown in FIG. 1, the low-level feature information and the mid-level feature information may be lost.

In a deep learning structure 200 of FIG. 2, a recognition/verification module 240 may perform a recognition and verification based on feature information corresponding to all levels. For example, the recognition/verification module 240 may recognize and verify an input image 101 based on low-level feature information, mid-level feature information, and high-level feature information. The number of levels of feature information shown in FIG. 2, (i.e., three levels including a high level, a mid level and a low level) is an example. According to at least some example, other numbers of levels of feature information (e.g., at least two levels) may be obtained by an abstraction of features of an image. According to at least one example embodiment of the inventive concepts, the deep learning structure 200 may be implemented by hardware, one or more processors executing computer-readable code, or a combination of the above-referenced hardware and processors executing computer-readable code, as will be discussed in greater detail at the end of the disclosure.

As described above, all feature information output for each of the layers may be utilized and thus, a recognition rate and a verification rate of an image may be ensured.

The deep learning structure 200 may be applied to recognize and verify various input images 101. For example, the input image 101 may include an image associated with an object (for example, an image representing a shape of an object). The object may include, for example, an animal, an inanimate object, or a human (for example, a human face, or a human body) included in a region of interest (ROI) of an image. For example, the deep learning structure 200 may be used to recognize a human face and to perform a recognition and authentication of a user. Also, the deep learning structure 200 may be used to search for and manage a considerable amount of content (for example, multimedia including a picture or video), automatically.

The deep learning structure 200 may be implemented in software or hardware, for example, a chip, and may be mounted in an electronic device. The electronic device may include, for example, a mobile device (for example, a mobile phone, or a smartphone), a home appliance (for example, a TV), and the like.

The deep learning structure 200 may be applied to an apparatus for recognizing an image, and an apparatus for verifying an image (hereinafter, referred to as an "image recognition apparatus," and an "image verification apparatus," respectively). The image recognition apparatus and the image verification apparatus may be trained based on training data. The training data may include, for example, training information, a training element and a training image associated with a training object.

In an example, training data used to train the image recognition apparatus may include a training image, and a training element associated with the training image. The image recognition apparatus may be trained to allow the training element to be output from the training image. In this example, the training element may be a value indicating a training object included in the training image. The above example will be further described with reference to FIG. 9.

In another example, training data used to train the image verification apparatus may include a pair of training images and training information. The image verification apparatus may be trained to allow the training information to be output from the pair of training images. For example, the image verification apparatus may be trained to associate the training information with the pair of training images. In this example, the training information may be a value indicating whether the training images include identical training objects. The above example will be further described with reference to FIG. 18.

A deep learning structure according to at least one example embodiment may include an artificial neural network. Examples of such a neural network include, but are not limited to, a convolutional neural network (CNN) and a deep convolutional neural network (DCNN). An example of the DCNN will be further described with reference to FIG. 6.

A neural network may include an input layer, a hidden layer, and an output layer. Each layer may include a plurality of nodes, and nodes between neighboring layers may be connected to each other with a connection weight. Each node may operate based on an activation model. An output value corresponding to an input value may be determined based on the activation model. An output value of an arbitrary node may be input to a node that is included in a next layer and that is connected to the arbitrary node. The node in the next layer may receive inputs of values output from a plurality of nodes. When the output value of the arbitrary node is input to the node in the next layer, a connection weight may be applied. The node in the next layer may output a value corresponding to the input value to a node that is included in a layer after the next layer and that is connected to the node, based on the activation model.

The output layer may include nodes corresponding to a plurality of elements. The nodes in the output layer may output feature values corresponding to the plurality of elements. Feature values output from the neural network may be transformed to elements using linear classifiers for the plurality of elements, which will be further described below.

Figure 3:
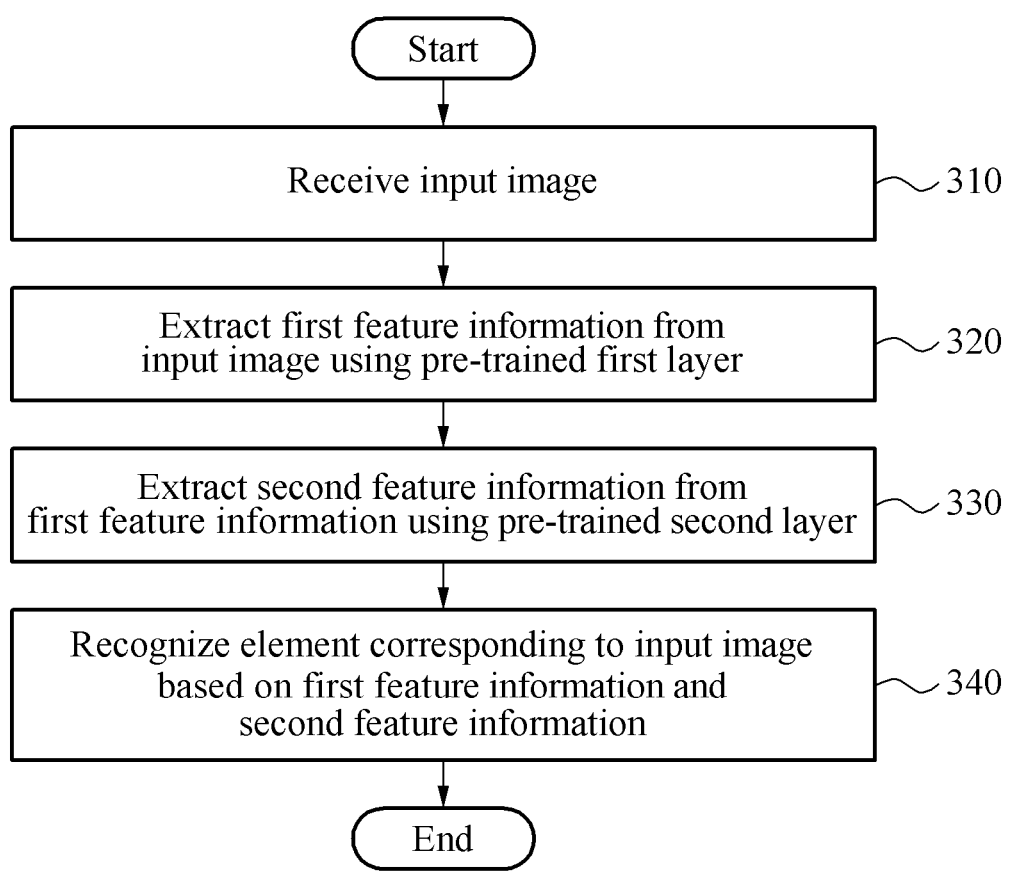
FIG. 3 is a flowchart illustrating a method of recognizing a feature of an image according to at least one example embodiment.

FIG. 3 is a flowchart illustrating a method of recognizing a feature of an image according to at least one example embodiment.

Referring to FIG. 3, in operation 310, an apparatus for recognizing a feature of an image, hereinafter referred to as a feature recognition apparatus, may receive an input image using an image receiver. The input image may include an image associated with at least one object, as described above. The input image received using the image receiver may be, for example, a preprocessed image. In the present disclosure, the preprocessed image may refer to an arbitrary image processed to have a predetermined or, alternatively, desired size, a predetermined or, alternatively, desired resolution, and a ratio between an object and a background in the arbitrary image. The background may be an area other than an area representing the object in the image.

In operation 320, a first extractor of the feature recognition apparatus may extract first feature information from the input image using a first layer. For example, the feature recognition apparatus may extract the first feature information indicating a first feature corresponding to the input image among first features, using the first layer.

The first layer may be, for example, a layer that is included in a deep learning network and that is pre-trained on first features based on training data.

The first feature information may indicate a first feature corresponding to the input image. For example, the first feature information may include a feature value indicating at least one first feature corresponding to the input image among a plurality of first features. Additionally, the first feature information may be provided as a feature matrix and a feature vector including a plurality of feature values indicating the first features. The first feature may include a feature image learned through an abstraction of a training image included in training data.

In operation 330, the feature recognition apparatus may extract second feature information from the first feature information, using a second layer. For example, the feature recognition apparatus may extract the second feature information indicating a second feature corresponding to the first feature information among second features, using the second layer. The second feature information may correspond to a higher level of image complexity than the first feature information.

The second layer may be, for example, a layer that is included in a deep learning network and that is pre-trained on second features based on the first features.

The second feature information may indicate a second feature corresponding to the first feature information. For example, the second feature information may include a feature value indicating at least one second feature corresponding to arbitrary first feature information among a plurality of second features. The second feature may include a feature image learned through an abstraction of the first feature.

In operation 340, the feature recognition apparatus may recognize an element corresponding to the input image, based on the first feature information and the second feature information. The element may include, for example, a value indicating an object included in reference images that are pre-learned from training data and stored.

For example, the feature recognition apparatus may generate, using a feature vector generator, a feature vector based on the first feature information and the second feature information, and may recognize, using a recognizer, an element corresponding to an object by comparing the generated feature vector to a pre-stored reference vector corresponding to each of a plurality of elements. For example, the pre-stored reference vector may be stored before the generation of the feature vector. In this example, the feature vector may be data including a plurality of feature values in the form of vectors.

FIG. 4 is a block diagram illustrating a configuration of a feature recognition apparatus 400 according to at least one example embodiment. According to at least one example embodiment of the inventive concepts, the feature recognition apparatus 400 may be implemented by hardware, one or more processors executing computer-readable code, or a combination of the above-referenced hardware and processors executing computer-readable code, as will be discussed in greater detail at the end of the disclosure.

Referring to FIG. 4, the feature recognition apparatus 400 may include an image receiver 410, a feature extractor 420, and a recognizer 430. The feature extractor 420 may include a first extractor 421 and a second extractor 422.

The image receiver 410 may receive an input image 401 including an object. The input image 401 may be a preprocessed image.

The first extractor 421 may extract first feature information indicating a first feature corresponding to the input image 401 among first features, using a first layer. The first layer may be, for example, a layer pre-trained on the first features based on training data.

The second extractor 422 may extract second feature information indicating a second feature corresponding to the first feature information among second features, using a second layer. The second layer may be, for example, a layer pre-trained on the second features based on the first features.

The recognizer 430 may recognize an element corresponding to the object, based on the first feature information and the second feature information. For example, the recognizer 430 may include a feature vector generator (not shown) configured to generate a feature vector based on the first feature information and the second feature information. In this example, the recognizer 430 may recognize the element corresponding to the object by comparing the generated feature vector to a pre-stored reference vector corresponding to each of a plurality of elements. For example, as is discussed above, the pre-stored reference vector may be stored before the generation of the feature vector.

For example, the recognizer 430 may include a neural network, and may calculate a feature value corresponding to an element based on pre-learned weights between nodes included in the neural network.

An element 409 recognized by the recognizer 430, as a result of recognition of the input image 410 by the feature recognition apparatus 400, may include a value indicating a reference image or object recognized to correspond to the input image 401 by the recognizer 430 among pre-learned reference images.

For example, when three reference objects are learned, elements 409 recognized by the recognizer 430 may be represented as a value indicating a first reference object, a value indicating a second reference object, and a value indicating a third reference object. When an input image includes the second reference object, recognized elements may be represented by values of "0.1," "0.8," "0.1." In other words, an element corresponding to an object determined to be most similar to the second reference object may have a highest value.

Figure 5A:
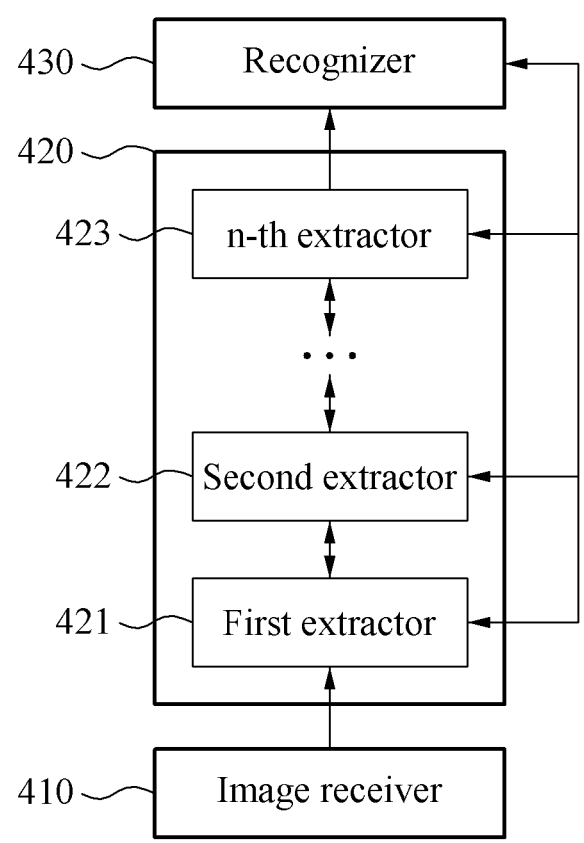
FIGS. 5A and 5B are block diagrams illustrating examples of a configuration of a feature extractor of FIG. 4.
Figure 5B:
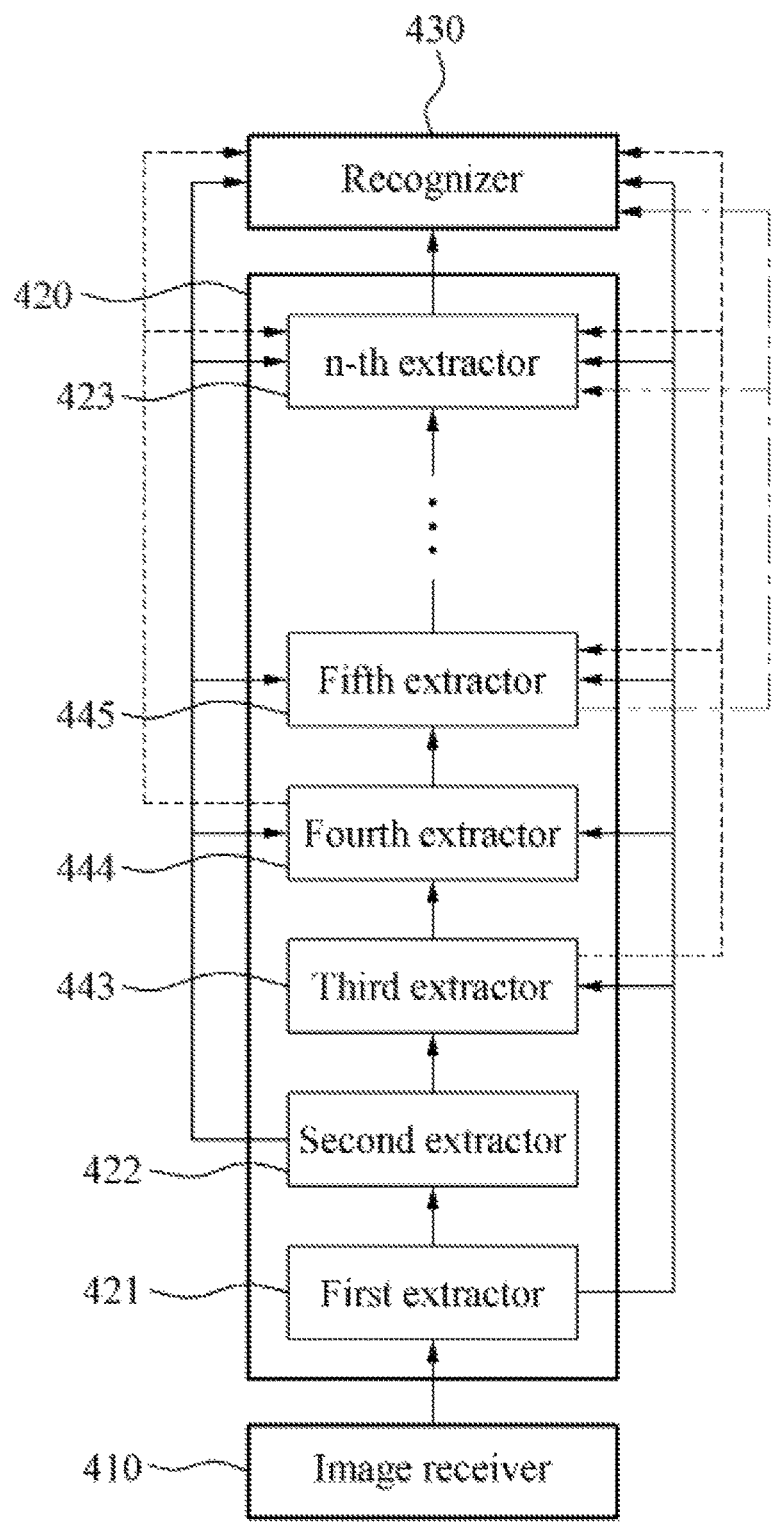

FIGS. 5A and 5B are block diagrams illustrating examples of a configuration of the feature extractor 420 of FIG. 4.

While, for the purpose of simplicity, feature extractor 420 is illustrated in FIG. 4 as including a first extractor 421 and a second extractor 422, referring to FIG. 5A, the feature extractor 420 may include the first extractor 421, the second extractor 422 and an n-th extractor 423, where n may be an integer equal to or greater than "3." An operation of each of extractors other than the first extractor 421 and the second extractor 422 will be described below based on an operation of an m-th extractor, where m may be an integer equal to or greater than "3" and equal to or less than "n." An operation of each of the first extractor 421 through the n-th extractor 423 may be performed, for example, by a single processor or a plurality of processors.

For example, the m-th extractor may extract m-th feature information indicating an m-th feature corresponding to (m−1)-th feature information among m-th features, using an m-th layer. The m-th layer may be, for example, a layer pre-trained on the m-th features based on (m−1)-th features. According to at least one example embodiment, higher levels of feature information may be associated with higher levels of image complexity in comparison to lower levels of feature information.

In this example, the recognizer 430 may recognize an element corresponding to an object included in an input image, based on the first feature information through n-th feature information.

The m-th features may be obtained by performing a higher abstraction of the (m−1)-th features. For example, the m-th layer may correspond to a level higher than a level corresponding to an (m−1)-th layer. A feature recognition apparatus according to at least one example embodiment may be used to recognize an object included in an image, using features in an abstraction process (for example, a first feature through an (n−1)-th feature) as well as a feature corresponding to a last level (for example, an n-th feature).

Referring to FIG. 5B, the feature extractor 420 may include a first extractor 421, a second extractor 422, a third extractor 443, a fourth extractor 444, a fifth extractor 445 and an n-th extractor 423, and n may be an integer equal to or greater than "3." An operation of each of the third extractor through the n-th extractor 423 will be described below based on an operation of an m-th extractor, and m may be an integer equal to or greater than "3" and equal to or less than "n." In FIG. 5B, all outputs of extractors with below level an extractor may be input to the extractor.

The m-th extractor may extract m-th feature information indicating an m-th feature corresponding to a combination of first feature information through (m−1)-th feature information among m-th features, using an m-th layer that is pre-trained on the m-th features based on first features through (m−1)-th features. The combination of the first feature information through the (m−1)-th feature information may be a vector in which values output from the first extractor 421 through an (m−1)-th extractor are arranged, and may have the same dimension as a sum of a number of nodes in an output layer of the first extractor 421 through a number of nodes in an output layer of the m-th extractor. The m-th extractor may adjust, based on a number of nodes in the m-th layer, a dimension of feature information generated by combining the first feature information through the (m−1)-th feature information. For example, the m-th extractor may include a fully connected layer, a pooling layer and a convolution layer, in addition to the m-th layer. In this example, the m-th extractor may process the feature information generated by combining the first feature information through the (m−1)-th feature information, using a corresponding layer (for example, the fully connected layer, the pooling layer and the convolution layer), and may adjust the dimension of the feature information generated by combining the first feature information through the (m−1)-th feature information to be the same as a dimension of the m-th layer (for example, the number of the nodes in the m-th layer).

For example, the fourth extractor may extract fourth feature information using a fourth layer. In this example, the fourth feature information may indicate a fourth feature corresponding to a combination of first feature information, second feature information and third feature information among fourth features. The fourth layer may be, for example, a layer pre-trained on the fourth features based on first features, second features and third features. When the first extractor 421, the second extractor 422 and the third extractor are assumed to have "n1" output nodes, "n2" output nodes and "n3" output nodes, respectively, a dimension of the combination of the first feature information through the third feature information may be a sum of "n1", "n2" and "n3." When a dimension of the fourth layer is "m4," the fourth extractor may adjust the dimension of the combination to be "m4," for example, using a fully connected layer, a pooling layer and a convolution layer. The dimension represents a number of data output from or input to a layer.

FIG. 6 is a block diagram illustrating a configuration of a feature extractor 620 and a recognizer 630 of a feature recognition apparatus according to at least one example embodiment.

The feature recognition apparatus of FIG. 6 may include, for example, a DCNN, and the DCNN may include the feature extractor 620 and the recognizer 630. According to at least one example embodiment, the extractor and recognizer 420 and 430 of the feature recognition apparatus 400 may be implemented by the feature extractor 620 and the recognizer 630, respectively.

The feature extractor 620 may include a first extractor 621, a second extractor 622, a third extractor 623, a fourth extractor 624, and a fifth extractor 625.

Each of the first extractor 621 through the fifth extractor 625 may include at least one layer, for example, a convolution layer, a pooling layer, and the like. Each of the first extractor 621 through the fifth extractor 625 may necessarily include a convolution layer. For example, the first extractor 621 may include a first layer, and the second extractor 622 may include a second layer. Each of the first layer and the second layer may include a convolution layer, a pooling layer, and the like.

The convolution layer may be used to perform a convolution filtering for filtering of information extracted by a previous extractor or a previous layer, using a filter with a predetermined or, alternatively, desired size (for example, 8×8). In FIG. 6, the convolution layer may be denoted by "CONV." For example, the feature extractor 620 or a processor may perform a convolution filtering using a convolution layer. A convolution layer of the first extractor 621 may perform a filtering of a predetermined or, alternatively, desired edge.

As a result of the convolution filtering, the same number of filtering images as a number of filters included in the convolution layer may be generated. The convolution layer may be formed with nodes included in the filtering images. Each of the nodes in the convolution layer may receive a value obtained by performing a filtering of an area with a predetermined or, alternatively, desired size in a feature image of a previous extractor or a previous layer. Exceptionally, each of nodes in the convolution layer in the first extractor 621 may receive a value obtained by performing a filtering of an input image. An activation model of each of the nodes in the convolution layer may be, for example, a rectifier linear unit (ReLU). The ReLU may refer to a model to output "0" in response to an input equal to or less than "0," and to output a value in linear proportion to an input exceeding "0."

The pooling layer may be used to extract representative values from feature images of a previous layer, through pooling. In FIG. 6, the pooling layer may be denoted by "POOLING." For example, the processor may extract a maximum value or, alternatively, a value above desired threshold, in a window with a predetermined or, alternatively, desired size while sliding the window by a predetermined or, alternatively, desired number of pixels for each feature image in a layer preceding a pooling layer. In this example, when a convolution layer precedes the pooling layer, feature images may be filtering images. As a result of the pooling, pooling images may be generated for each feature image. The pooling layer may be formed with nodes included in pooling images. Each of the nodes in the pooling layer may receive a value obtained by pooling from an area with a size of a corresponding feature image. For example, a pooling layer included in the first extractor 621 may be used to extract representative values from information corresponding to the input image of which filtering is performed.

Nodes between layers adjacent to the convolution layer and the pooling layer may be partially connected to each other, and may share a connection weight.

Filters of a convolution layer included in the second extractor 622 may perform a filtering of a complex edge, in comparison to the filters of the convolution layer included in the first extractor 621. A pooling layer included in the second extractor 622 may be used to extract representative values from filtering images (for example, first feature information) obtained by the filtering by the convolution layer in the second extractor 622 through pooling. As described above, in layers included in the second extractor 622, feature information with a higher complexity in comparison the first extractor 621 may be extracted. For example, feature information corresponding to a middle level of an input image may be extracted. The middle level may have, for example, a middle complexity.

A convolution layer of the third extractor 623 may be used to perform a convolution filtering using filters with predetermined or, alternatively, desired sizes. Each of the filters may perform a filtering of a predetermined or, alternatively, desired edge. Filters of the convolution layer of the third extractor 623 may perform a filtering of a complex edge, in comparison to the filters of the convolution layer of the second extractor 622.

Through a similar operation to the above-described operation, the fourth extractor 624 and the fifth extractor 625 may extract feature information with a higher complexity, in comparison to previous extractors. As shown in FIG. 6, the fourth extractor 624 may include a convolution layer, and the fifth extractor 625 may include a convolution layer and a pooling layer.

However, a number of extractors, and a configuration of layers in an extractor are not limited to those described above, and may be changed based on a design.

The recognizer 630 may include at least one layer, for example, a fully connected layer that is denoted as "FULLY CON" in FIG. 6. Each of the first extractor 621 through the fifth extractor 625 may necessarily include a convolution layer, as described above.

Nodes between layers adjacent to the fully connected layer may be fully connected to each other, and a connection weight may be individually set. For example, each of fully connected layers may include 2,048 nodes. Additionally, a model regularization algorithm, for example, a dropout may be applied to the fully connected layers. In the dropout, 50% of nodes may not randomly participate in learning in a current epoch. The above-described configuration of layers, the number of nodes, and the sizes of the filters are merely examples to facilitate understanding of the present disclosure, and may be changed. According to an example embodiment, nodes between a fully connected layer and layers included in all extractors of the feature extractor 620 may be fully connected to each other.

For example, the recognizer 630 may generate a feature vector based on values corresponding to all nodes in each of layers included in the feature extractor 620, using the above-described fully connected layer. In this example, the values may include, for example, values corresponding to all nodes in the first layer and values corresponding to all nodes in the second layer.

The recognizer 630 may further include a loss layer (not shown), and may calculate losses corresponding to a plurality of elements using the loss layer. The loss layer may include linear classifiers corresponding to the plurality of elements. The loss layer may predict the plurality of elements from outputs of fully connected layers, using the linear classifiers, and may calculate losses by comparing the predicted elements to actual elements.

The losses may be back-propagated to the fully connected layers and convolution layers, using a back propagation scheme. Based on the back-propagated losses, connection weights in the convolution layers and the fully connected layers may be updated. The configuration of the layers, the activation mode, and a related algorithm described above with reference to FIG. 6 may be changed variously based on a type of data and an implementation purpose.

Figure 7:
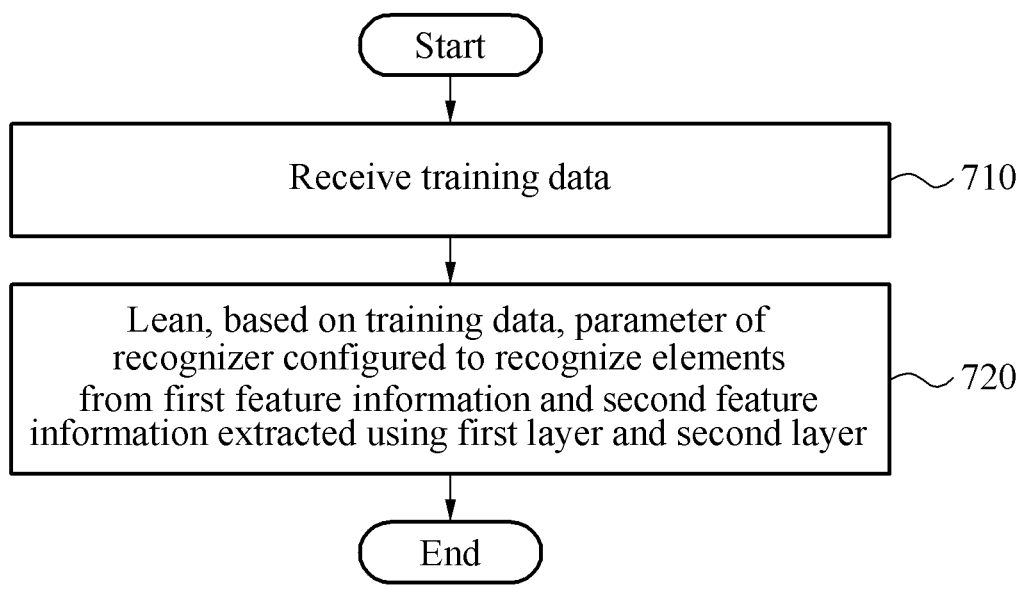
FIG. 7 is a flowchart illustrating a method of learning a feature to recognize an image according to at least one example embodiment.

FIG. 7 is a flowchart illustrating a method of learning a feature to recognize an image according to at least one example embodiment.

Referring to FIG. 7, in operation 710, a receiver of an apparatus for learning a feature to recognize an image may receive training data. For example, training data used to recognize an image may include a training element, and a training image associated with a training object.

In operation 720, a learner of the apparatus may learn a parameter of a recognizer so that the recognizer may recognize a training element from a training image. The recognizer may be configured to recognize a plurality of elements from first feature information and second feature information. For example, the first feature information may be extracted from an input image using a first layer, and the second feature information may be extracted using a second layer. Learning of the parameter of the recognizer will be further described with reference to FIG. 8.

Figure 8:
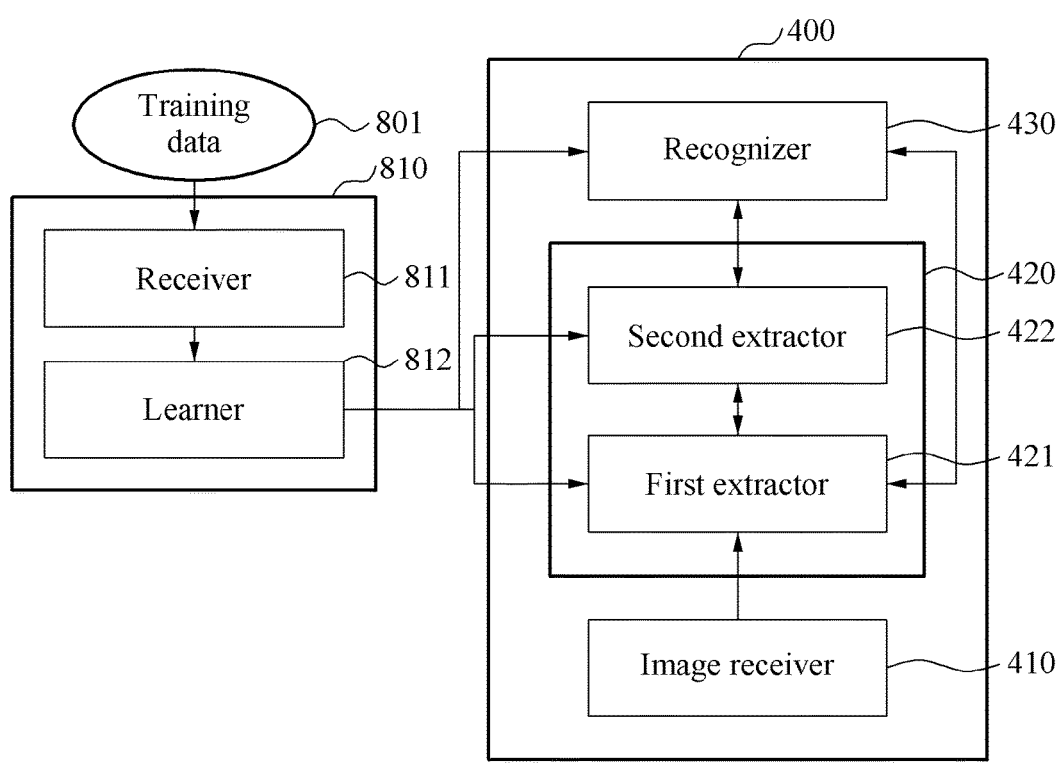
FIG. 8 is a block diagram illustrating a configuration of an apparatus for learning a feature to recognize an image according to at least one example embodiment.

FIG. 8 is a block diagram illustrating a configuration of an apparatus 810 for learning a feature to recognize an image according to at least one example embodiment.

The apparatus 810 of FIG. 8 may include a receiver 811 and a learner 812. According to at least one example embodiment of the inventive concepts, the apparatus 810 may be implemented by hardware, one or more processors executing computer-readable code, or a combination of the above-referenced hardware and processors executing computer-readable code, as will be discussed in greater detail at the end of the disclosure.

The receiver 811 may receive training data 801. The training data 801 may include a training element and a training image associated with a training object.

The learner 812 may learn a parameter to be provided to the feature recognition apparatus 400 of FIG. 4. The learner 812 may learn a parameter of the feature recognition apparatus 400 so that the recognizer 430 may recognize a training element from a training image. The recognizer 430 may recognize a plurality of elements from first feature information extracted from an input image using a first layer, and second feature information extracted using a second layer. The learner 812 may transfer the learned parameter to the feature recognition apparatus 400.

In the present disclosure, a parameter may include, for example, a structure of a neural network (for example, a type and a number of layers), a connection weight between nodes, and the like.

For example, the learner 812 may learn a parameter of a first layer of the first extractor 421 so that first features may be extracted from a training image. Additionally, the learner 812 may learn a parameter of a second layer of the second extractor 422 so that second features may be extracted from at least one of the first features. Furthermore, the learner 812 may learn a parameter of the recognizer 430 so that the recognizer 430 may recognize the training element from the first features and the second features.

According to an example embodiment, the learner 812 may calculate a loss corresponding to the training element. When the recognizer 430 includes a neural network, the learner 812 may learn weights between nodes included in the neural network, based on the loss.

For example, the learner 812 may calculate losses between predicted elements and actual elements, because the learner 812 knows training elements labeled to the training image.

The learner 812 may update the parameter to be provided to the recognizer 430 using a back propagation scheme, so that the losses may be reduced. For example, the learner 812 may propagate the losses in an inverse direction, that is, a direction from an output layer to an input layer through a hidden layer in the neural network. When the losses are propagated in the inverse direction, connection weights between nodes may be updated so that the losses may be reduced. As described above, the learner 812 may update the parameter to be provided to the recognizer 430, based on losses corresponding to a plurality of elements. The completely updated parameter may be used in a next learning epoch, and the above-described multitask learning operation may be repeatedly performed until the losses are less than a predetermined or, alternatively, desired threshold. The learned parameter may be provided to the recognizer 430.

The learner 812 may allow the feature recognition apparatus 400 to store a final parameter (for example, a connection weight) of each of the first extractor 421, the second extractor 422 and the recognizer 430.

The structure of the feature extractor 420 of FIG. 4 described in FIG. 8 is merely an example, and there is no limitation thereto. In the examples of the configuration of the feature extractor 420 of FIGS. 5A and 5B, the learner 812 may learn a parameter of each layer, and may transfer the parameter to the feature recognition apparatus 400. In the example of FIG. 5A, the learner 812 may learn a parameter of the m-th layer of the m-th extractor so that the m-th features may be extracted from at least one (m−1)-th feature. In the example of FIG. 5B, the learner 812 may learn a parameter of the m-th layer of the m-th extractor so that the m-th features may be extracted from the first features through the (m−1)-th features.

Figure 9:
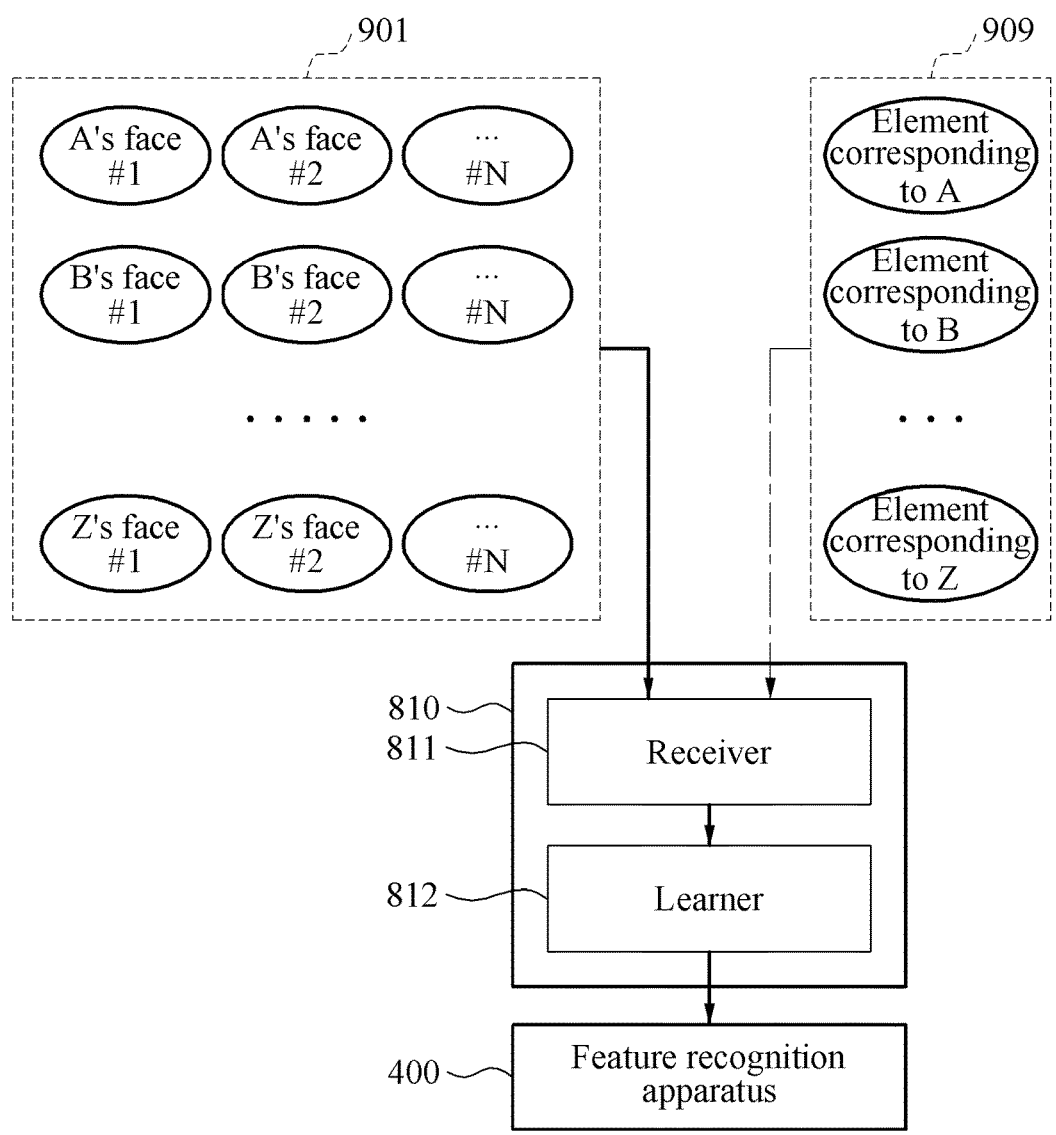
FIG. 9 illustrates an example of training data applied to the apparatus of FIG. 8.

FIG. 9 illustrates an example of training data applied to the apparatus 810 of FIG. 8.

The training data of FIG. 9 may include a training image 901 and a training element 909. The training data may be input to the learner 812 through the receiver 811. The learner 812 may provide a learned parameter to the feature recognition apparatus 400.

The training image 901 may be associated with a training object. In FIG. 9, the training object may include, for example, a human face, but may not be limited thereto. Accordingly, training data associated with another object may be generated.

According to an example embodiment, a plurality of training images 901 may be provided for a single training object. In FIG. 9, a plurality of training images 901 may be provided for an A's face. The training images 901 may be images representing different aspects of the same object, for example, different face angles, or different facial expressions.

The training element 909 may be labeled to the training object. When the plurality of training images 901 include identical training objects, the same training element 909 may be labeled to the plurality of training images 901. For example, in FIG. 9, an element corresponding to A may be labeled to "N" As faces, to form training data, and N may be an integer equal to or greater than "1."

Figure 10:
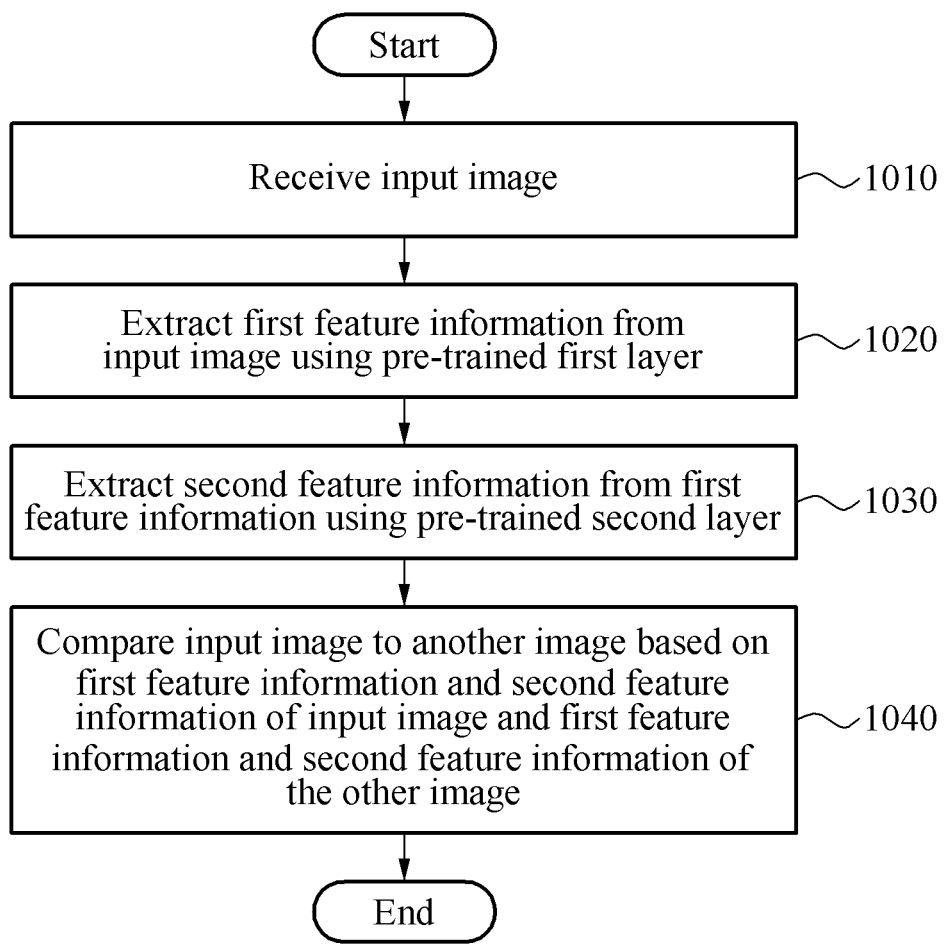
FIG. 10 is a flowchart illustrating a method of verifying a feature of an image according to at least one example embodiment.

FIG. 10 is a flowchart illustrating a method of verifying a feature of an image according to at least one example embodiment.

Referring to FIG. 10, in operation 1010, an image receiver of an apparatus for verifying a feature of an image (hereinafter, referred to as a feature verification apparatus) may receive an input image. The input image may include an object.

In operation 1020, a first extractor of the feature verification apparatus may extract first feature information from the input image, using a first layer. The first layer may be, for example, a layer pre-trained on first features based on training data. The first feature information may indicate a first feature corresponding to the input image among the first features.

In operation 1030, a second extractor of the feature verification apparatus may extract second feature information from the first feature information, using a second layer. The second layer may be, for example, a layer pre-trained on second features based on the first features. The second feature information may indicate a second feature corresponding to the first feature information among the second features.

In operation 1040, a verifier of the feature verification apparatus may compare the input image to another image, based on the first feature information and the second feature information of the input image and first feature information and second feature information associated with the other image. For example, the verifier may determine whether the object of the input image is similar to an object of the other image, based on the first feature information and the second feature information of the input image and the first feature information and the second feature information associated with the other image.

Figure 11:
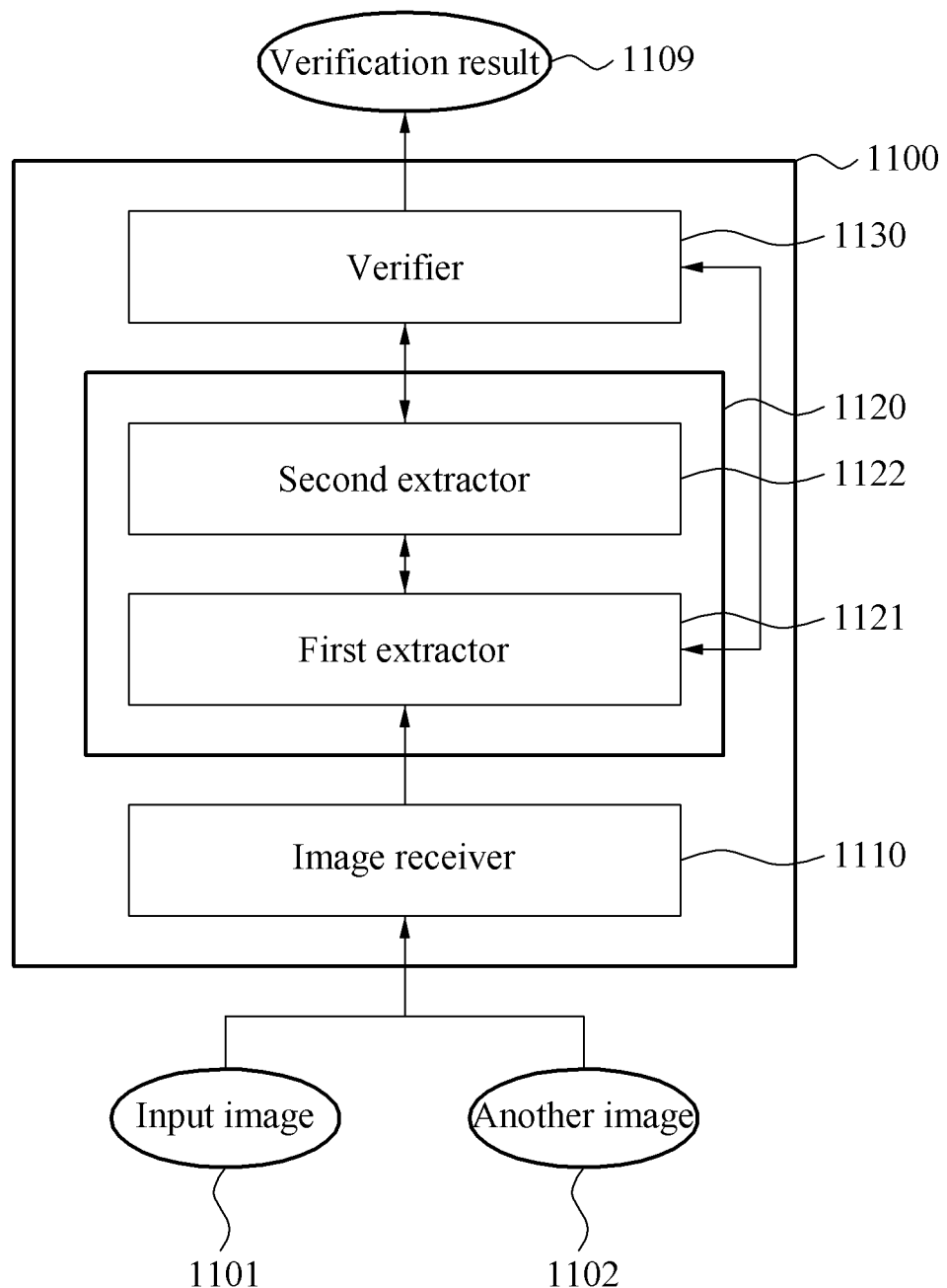
FIG. 11 is a block diagram illustrating an example of a configuration of an apparatus for verifying a feature of an image according to at least one example embodiment.

FIG. 11 is a block diagram illustrating a configuration of a feature verification apparatus 1100 according to at least one example embodiment. According to at least one example embodiment of the inventive concepts, the feature verification apparatus 1100 may be implemented by hardware, one or more processors executing computer-readable code, or a combination of the above-referenced hardware and processors executing computer-readable code, as will be discussed in greater detail at the end of the disclosure.

The feature verification apparatus 1100 of FIG. 11 may include an image receiver 1110, a feature extractor 1120, and a verifier 1130. The feature extractor 1120 may include a first extractor 1121 and a second extractor 1122.

The image receiver 1110 may receive an input image 1101 and another image 1102. The other image 1102 may be compared to the input image 1101 and may include an object identical to or different from an object of the input image 1101. For example, the image receiver 1110 may sequentially or simultaneously the input image 1101 and the other image 1102.

The first extractor 1121 may extract first feature information indicating a first feature corresponding to the input image 1101 among first features, using a first layer. The first extractor 1121 may also extract first feature information associated with the other image 1102, using the first layer.

The second extractor 1122 may extract second feature information indicating a second feature corresponding to the first feature information among second features, using a second layer. The second extractor 1122 may also extract second feature information associated with the other image 1102, using the second layer.

The verifier 1130 may compare the first feature information and the second feature information of the input image 1101 to the first feature information and the second feature information associated with the other image 1102, and may determine whether the object of the input image 1101 is similar to or identical to the object of the other image 1102. The verifier 1130 may output, as a verification result 1109, information indicating whether the object of the input image 1101 is identical to the object of the other image 1102. For example, a value of "1" may be output in response to the objects being identical to each other, and a value of "−1" may be output in response to the objects being different from each other.

For example, the verifier 1130 may generate a feature vector associated with the input image 1101 based on the first feature information and the second feature information of the input image 1101, and may generate a feature vector associated with the other image 1102 based on the first feature information and the second feature information associated with the other image 1102. The verifier 1130 may compare the feature vector associated with the input image 1101 to the feature vector associated with the other image 1102, and may determine whether the object of the input image 1101 is similar to the object of the other image 1102.

To determine whether the objects are similar to each other, the verifier 1130 may calculate a similarity between the generated feature vectors. When the similarity exceeds a predetermined or, alternatively, desired threshold similarity, the verifier 1130 may determine that the object of the input image 1101 and the object of the other image 1102 are identical to each other. The similarity between the feature vectors may be calculated, for example, as a level to which feature values of the feature vectors and histograms are similar to each other.

Additionally, the verifier 1130 may calculate a similarity between a set of recognized elements, that is, a result of a recognition of the input image 1101 by the recognizer 430 of FIG. 4 and a set of elements, that is, a result of a recognition of the other image 1102. The similarity may be calculated as a degree to which histograms of the two sets are similar to each other.

Figure 12:
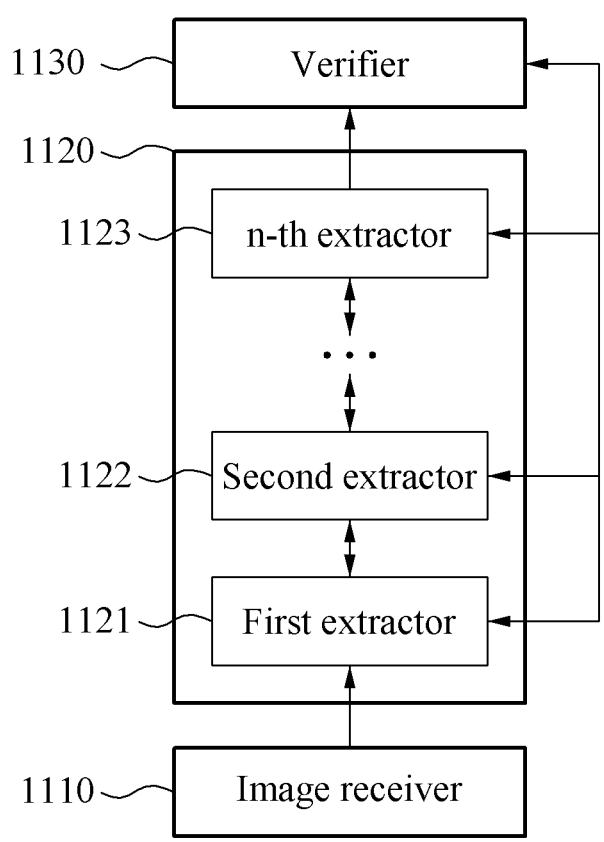
FIG. 12 is a block diagram illustrating a configuration of a feature extractor of FIG. 11.

FIG. 12 is a block diagram illustrating a configuration of the feature extractor 1120 of FIG. 11.

The feature extractor 1120 may include the first extractor 1121 and the second extractor 1122, as shown in FIG. 11. In FIG. 12, the feature extractor 1120 may further include a third extractor through an n-th extractor 1123, and n is an integer equal to or greater than "3." The third extractor through the n-th extractor 1123 may operate similarly to the m-th extractor of FIG. 5A.

The verifier 1130 may determine whether an object of an input image is similar to or identical to an object of another image, based on first feature information through n-th feature information of each of the input image and the other image.

The feature verification apparatus 1100 may be used to determine whether an object included in an input image is similar to or identical to an object included in another image, based on all of features (for example, a first feature through an (n−1)-th feature) in an abstraction process as well as a feature corresponding to a last level (for example, an n-th feature).

However, the configuration of the feature extractor 1120 is not limited to that of FIG. 12, and may be similar to the configuration of the feature extractor 420 of FIG. 5B.

Figure 13:
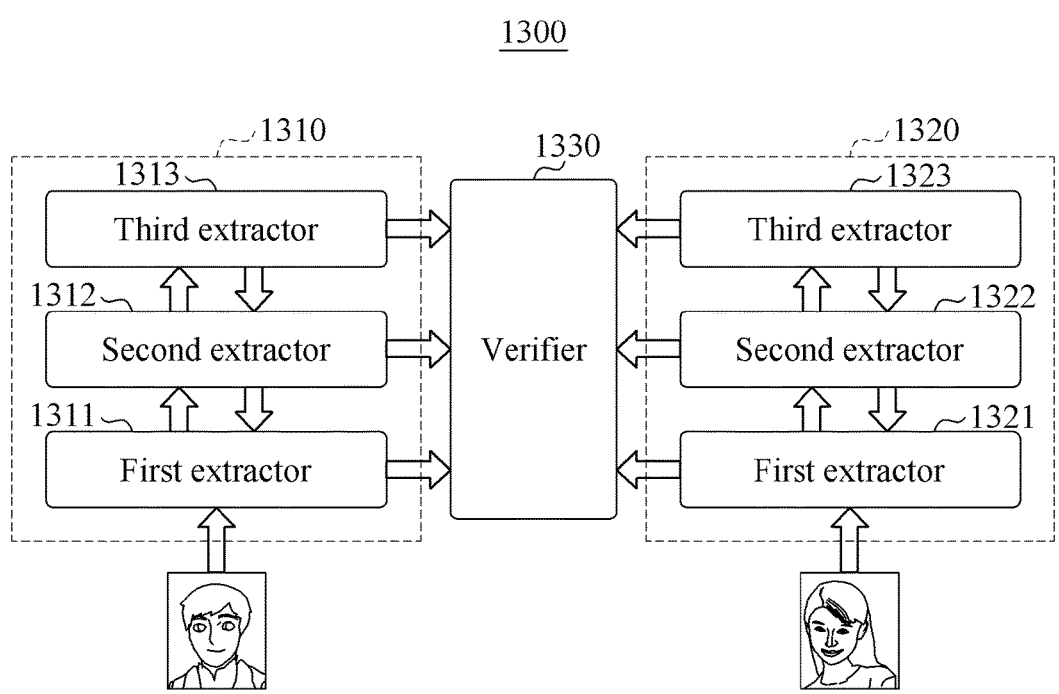
FIG. 13 is a bock diagram illustrating another example of a configuration of an apparatus for verifying a feature of an image according to at least one example embodiment.

FIG. 13 is a bock diagram illustrating a configuration of a feature verification apparatus 1300 according to at least one example embodiment. According to at least one example embodiment of the inventive concepts, the feature verification apparatus 1300 may be implemented by hardware, one or more processors executing computer-readable code, or a combination of the above-referenced hardware and processors executing computer-readable code, as will be discussed in greater detail at the end of the disclosure.

Referring to FIG. 13, the feature verification apparatus 1300 may include two feature extractors (for example, a first feature extractor 1310 and a second feature extractor 1320) and a verifier 1330. The first feature extractor 1310 may include a first extractor 1311, a second extractor 1312, and a third extractor 1313, and the second feature extractor 1320 may include a first extractor 1321, a second extractor 1322, and a third extractor 1323.

Each of the first extractor 1311 through the third extractor 1313 in the first feature extractor 1310 and the first extractor 1321 through the third extractor 1323 in the second feature extractor 1320 may be trained using a method of FIG. 16 that will be described below. The first feature extractor 1310 and the second feature extractor 1320 may use the same learning result. For example, a connection weight applied to the first extractor 1311 through the third extractor 1313 may be identical to a connection weight applied to the first extractor 1321 through the third extractor 1323.

The first feature extractor 1310 may extract first feature information through third feature information associated with an input image. The second feature extractor 1320 may extract first feature information through third feature information associated with another image.

For example, the second feature extractor 1320 may extract the first feature information associated with the other image, using a layer (for example, a layer corresponding to the first extractor 1321 of the second feature extractor 1320) that is separated from a first layer corresponding to the first extractor 1311 and that is trained in the same way as the first layer. The second feature extractor 1320 may also extract the second feature information associated with the other image, using a layer (for example, a layer corresponding to the second extractor 1322 of the second feature extractor 1320) that is separated from a second layer corresponding to the second extractor 1312 and that is trained in the same way as the second layer. The third feature information associated with the other image may also be extracted similarly to the first feature information and the second feature information.

The verifier 1330 may compare a feature vector generated based on the first feature information through the third feature information extracted by the first feature extractor 1310 to a feature vector generated based on the first feature information through the third feature information extracted by the second feature extractor 1320, and may determine whether an object included in the input image is identical to an object included in the other image.

Figure 14:
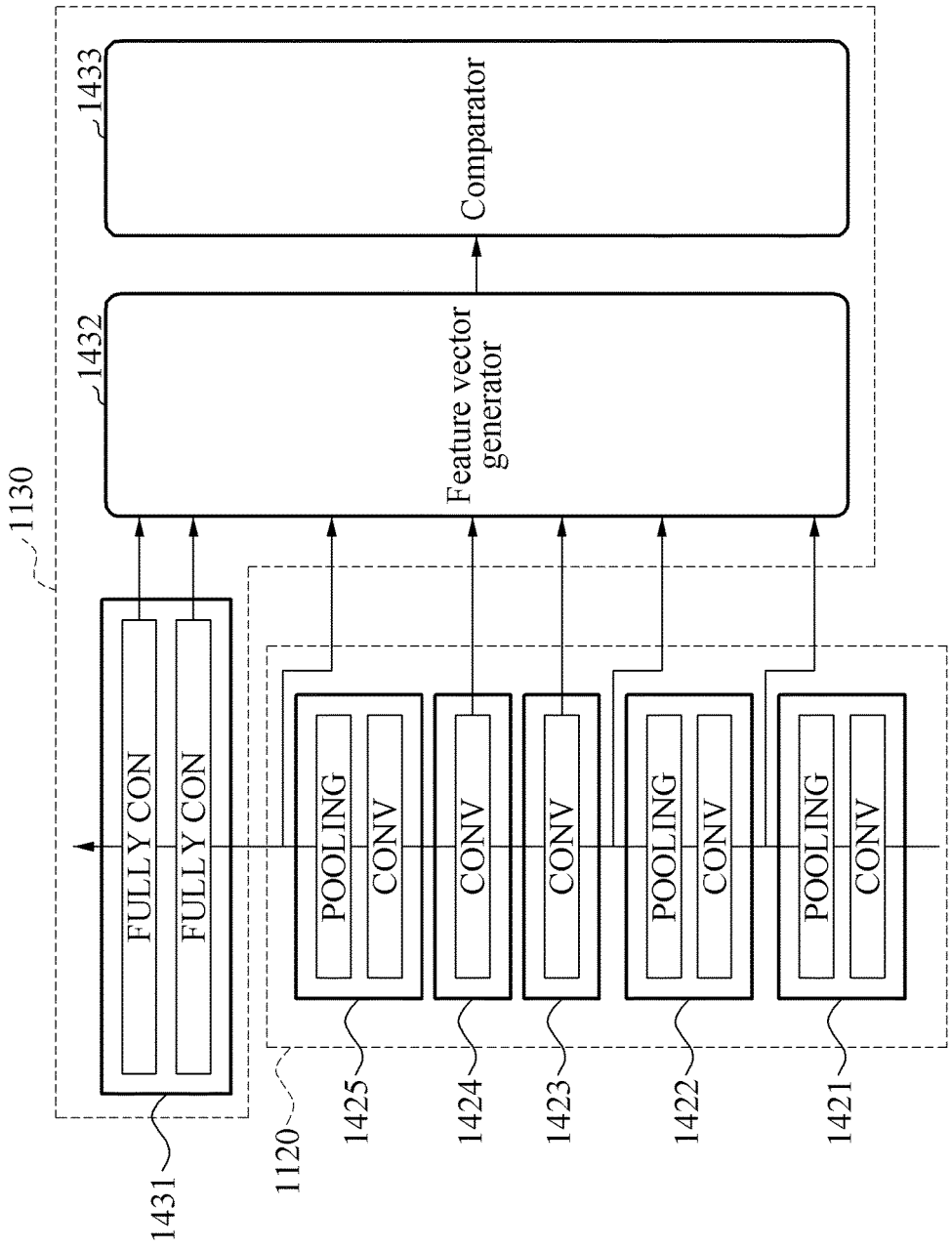
FIGS. 14 and 15 are block diagrams illustrating examples of configurations of the feature extractor and a verifier of FIG. 11.
Figure 15:
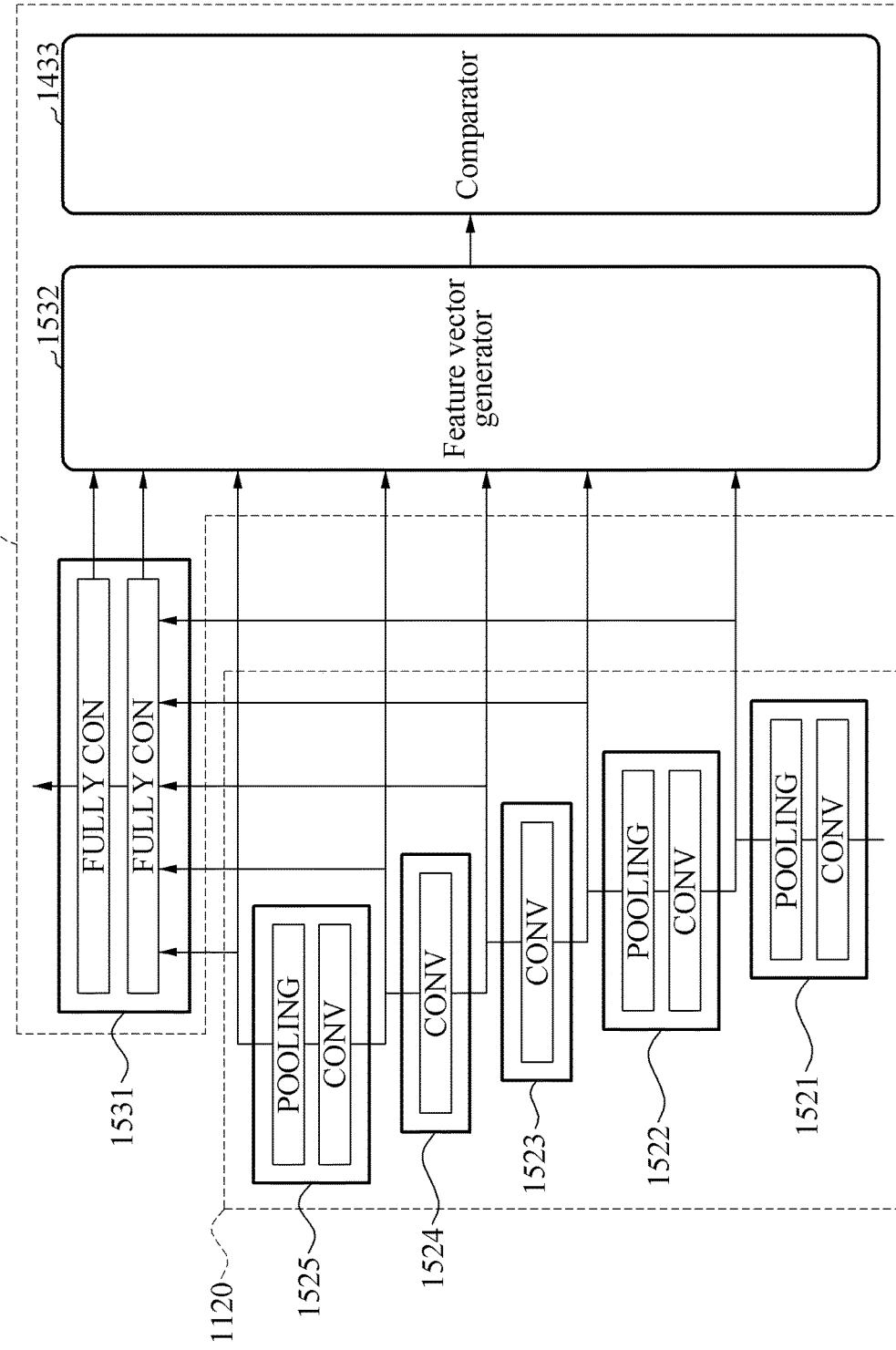

FIGS. 14 and 15 are block diagrams illustrating examples of configurations of the feature extractor 1120 and the verifier 1130 of FIG. 11.

The feature extractor 1120 and the verifier 1130 may be configured in various ways. FIGS. 14 and 15 illustrate examples of the feature extractor 1120 and the verifier 1130.

Referring to FIGS. 14 and 15, first extractors 1421 and 1521, second extractors 1422 and 1522, and fifth extractors 1425 and 1525 may each include a pooling layer and a convolution layer. Third extractors 1423 and 1523 and fourth extractors 1424 and 1524 may each include a convolution layer. A configuration of layers included in each extractor is merely an example and accordingly, may be changed based on a design.

In FIG. 14, the verifier 1130 may include at least one fully connected layer, for example a fully connected layer 1431, a feature vector generator 1432, and a comparator 1433. In FIG. 15, the verifier 1130 may include at least one fully connected layer, for example a fully connected layer 1531, a feature vector generator 1532, and a comparator 1433. The fully connected layers 1431 and 1531 may be used to reduce a quantity of data of feature information.

The feature vector generator 1432 may generate a feature vector corresponding to an input image and a feature vector corresponding to another image, may perform a linear transformation, and may transform a dimension of each of the feature vectors. For example, the feature vector generator 1432 may reduce a dimension of the feature vector. The feature vector generator 1532 may perform the same function as that of the feature vector generator 1432.

The verifier 1130 of FIG. 14 may include the fully connected layer 1431 connected to all nodes of a layer corresponding to a last level (for example, a level corresponding to the fifth extractor 1425). For example, the feature vector generator 1432 may generate a feature vector, based on feature information extracted by the first extractor 1421 through the fifth extractor 1425 and values output from the fully connected layer 1431. The comparator 1433 may receive the feature vector corresponding to the input image and the feature vector corresponding to the other image from the feature vector generator 1432, and may determine whether an object included in the input image is identical to an object included in the other image.

The verifier 1130 of FIG. 15 may generate a feature vector corresponding to an input image based on feature values that are calculated based on first feature information through n-th feature information associated with the input image and feature information corresponding to all nodes in each layer (for example, feature information input to the fully connected layer 1531), and may also generate a feature vector corresponding to another image based on feature values that are calculated based on first feature information through n-th feature information associated with the other image and feature information corresponding to all nodes in each layer.

The verifier 1130 of FIG. 15 may include the fully connected layer 1531 connected to all nodes of layers corresponding to all levels (for example, layers corresponding to the first extractor 1521 through the fifth extractor 1525). For example, the feature vector generator 1532 may generate a feature vector based on feature information extracted by the first extractor 1521 through the fifth extractor 1525 and values output from the fully connected layer 1531.

A number and a configuration of extractors included in the feature extractor 1120 of FIGS. 14 and 15 and a configuration of the fully connected layers 1431 and 1531 included in the verifier 1130 are merely examples and accordingly, may be changed based on a design.

Figure 16:
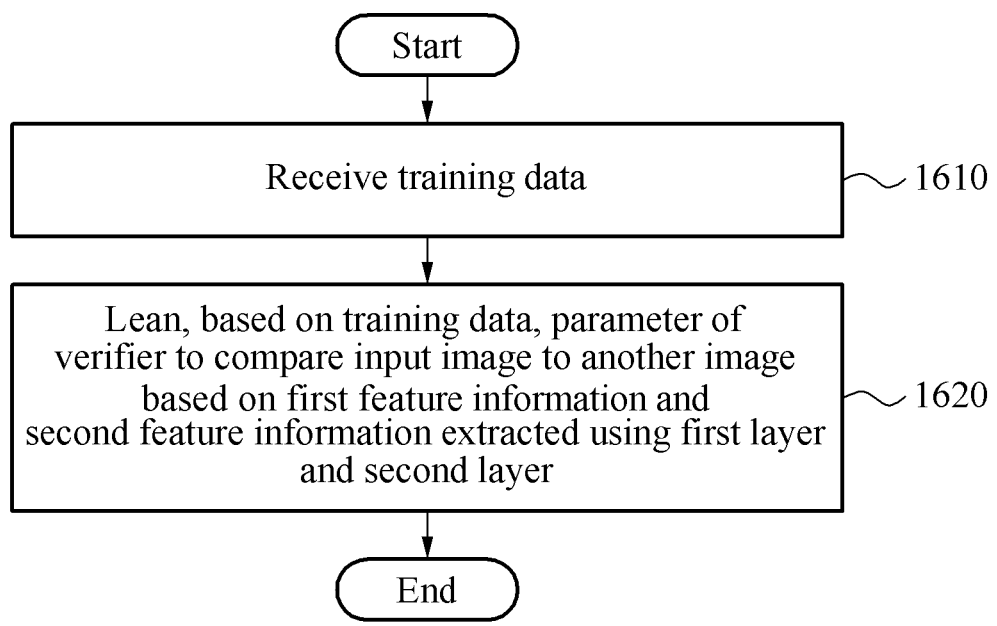
FIG. 16 is a flowchart illustrating a method of learning a feature to verify an image according to at least one example embodiment.

FIG. 16 is a flowchart illustrating a method of learning a feature to verify an image according to at least one example embodiment.

Referring to FIG. 16, in operation 1610, a receiver of an apparatus for learning a feature to verify an image may receive training data. For example, the receiver may receive a pair of training images and training information corresponding to the pair of training images.

In operation 1620, a learner of the apparatus may learn a parameter of a verifier based on the training data. The verifier may be configured to compare an input image to another image based on first feature information and second feature information extracted using a first layer and a second layer.

For example, the learner may learn the parameter of the verifier so that a result of comparing, by the verifier, the training images may correspond to the training information. In this example, the verifier may be configured to determine whether two input images are similar to each other, based on first feature information extracted from the two input images using the first layer and based on second feature information extracted using the second layer.

The training information may include information indicating whether the training images include identical objects. For example, when the training images include identical objects, the training information may indicate "1." When the training images include different objects, the training information may indicate "−1." The above-described training information is merely an example and accordingly, may include all information indicating true T corresponding to a pair of training images with identical objects and false F corresponding to a pair of training images with different objects.

Figure 17:
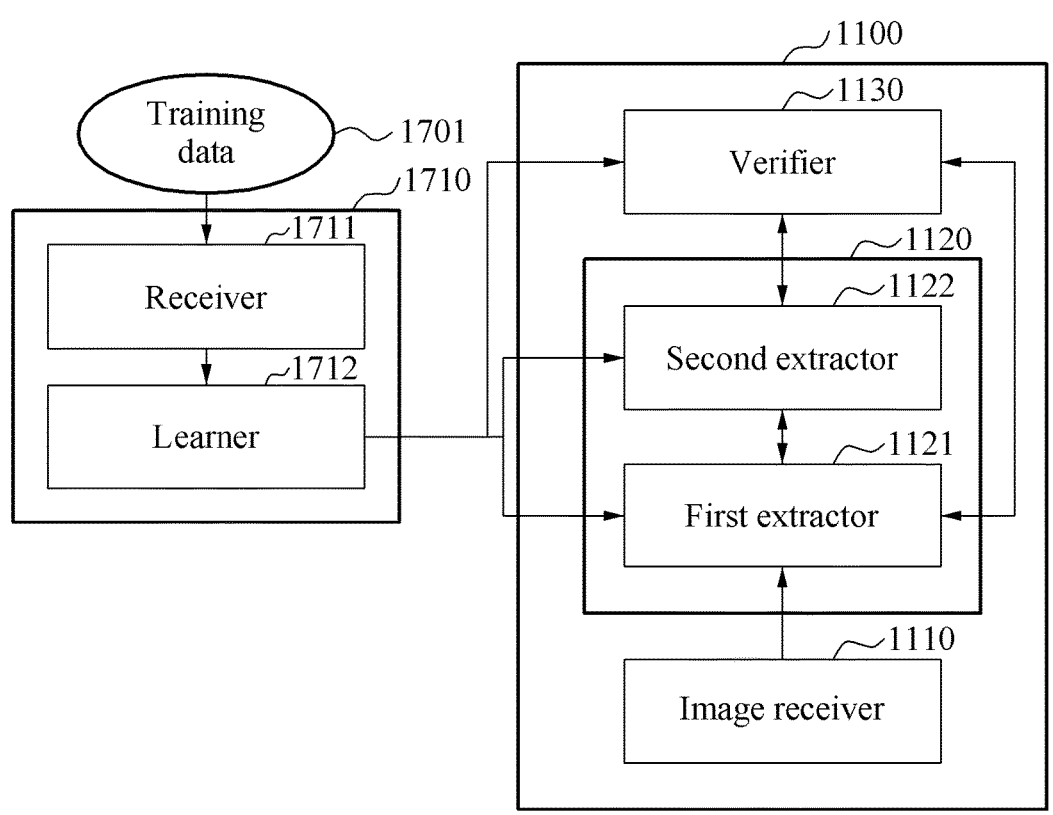
FIG. 17 is a block diagram illustrating a configuration of an apparatus for learning a feature to verify an image according to at least one example embodiment.

FIG. 17 is a block diagram illustrating a configuration of an apparatus 1710 for learning a feature to verify an image according to at least one example embodiment. According to at least one example embodiment of the inventive concepts, the apparatus 1710 may be implemented by hardware, one or more processors executing computer-readable code, or a combination of the above-referenced hardware and processors executing computer-readable code, as will be discussed in greater detail at the end of the disclosure.

The apparatus 1710 may include a receiver 1711 and a learner 1712.

The receiver 1711 may receive training data. The training data may include a pair of training images and training information.

The learner 1712 may learn a parameter to be provided to the feature verification apparatus 1100 of FIG. 11. The learner 1712 may learn a parameter of the feature verification apparatus 1100 so that a result of verification of the pair of training images by the verifier 1130 may correspond to the training information. The learner 1712 may transfer the learned parameter to the feature verification apparatus 1100. According to at least one example embodiment of the inventive concepts, the feature verification apparatus 1100 may be implemented by hardware, one or more processors executing computer-readable code, or a combination of the above-referenced hardware and processors executing computer-readable code, as will be discussed in greater detail at the end of the disclosure.

For example, the learner 1712 may learn a parameter of a first layer of the first extractor 1121 so that first features may be extracted from each of the training images, and may learn a parameter of a second layer of the second extractor 1122 so that second features may be extracted from the first features. Also, the learner 1712 may learn a parameter of the verifier 1130 so that the verifier 1130 may output training information based on the first features and second features corresponding to each of the training images.

The learner 1712 may calculate a loss corresponding to the training information. When the verifier 1130 includes a neural network, the learner 1712 may learn weights between nodes included in the neural network, based on the loss.

For example, the learner 1712 may calculate losses between actual training information and a verification result as a result output through the learner 1712 (for example, information indicating whether two input images are identical to each other), because the learner 1712 knows training information labeled to the pair of the training images.

The learner 1712 may update a parameter to be provided to the verifier 1130 so that losses may be reduced using a back propagation scheme, similarly to a learning process for recognition of FIG. 8. Unlike the learner 812 of FIG. 8, the learner 1712 may learn the parameter of the feature verification apparatus 1100 so that training information may be output as a result of the verifier 1130 when a pair of training images is input to the image receiver 1110. In this example, the learner 1712 may update a connection weight between nodes so that losses may be reduced. The learner 1712 may allow the feature verification apparatus 1100 to store a final parameter (for example, a connection weight) of each of the image receiver 1110, the first extractor 1121, the second extractor 1122 and the verifier 1130.

Figure 18:
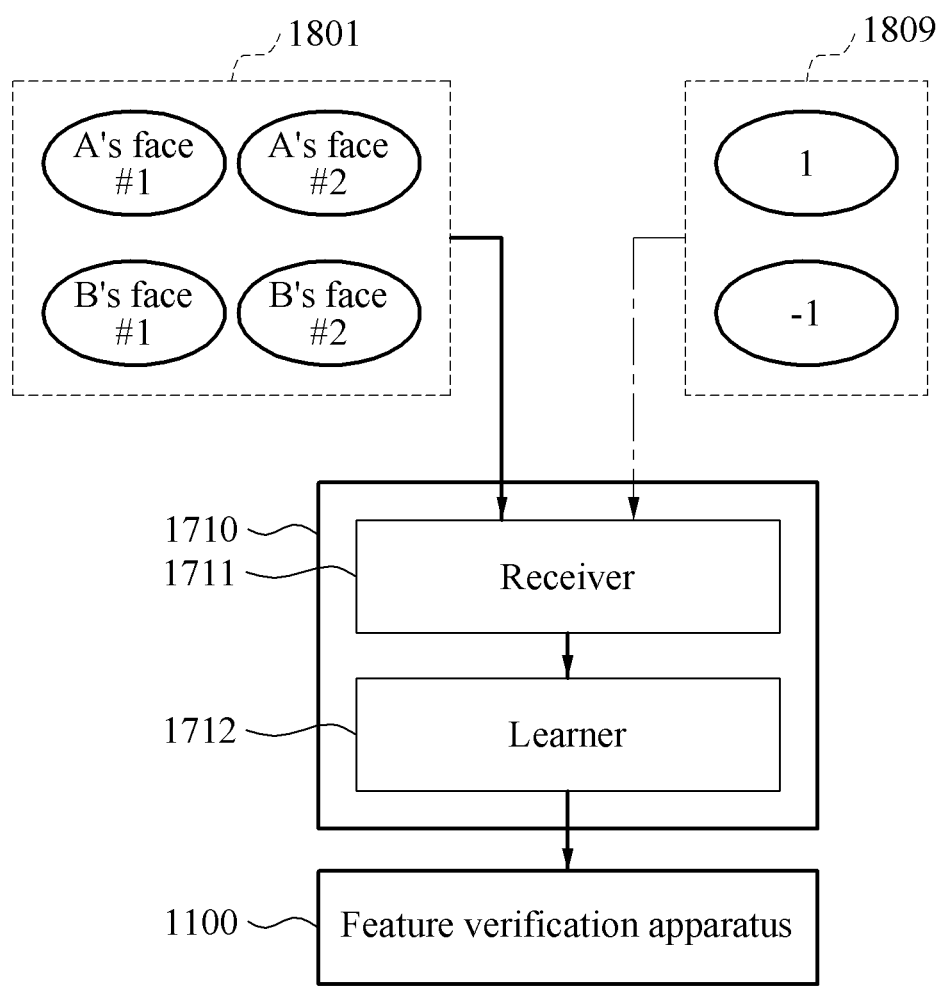
FIG. 18 illustrates an example of training data applied to the apparatus of FIG. 17.

FIG. 18 illustrates an example of training data applied to the apparatus 1710 of FIG. 17.

Referring to FIG. 18, the training data may include a pair 1801 of training images and training information 1809. The training data may be input to the learner 1712 through the receiver 1711. The learner 1712 may provide the learned parameter to the feature verification apparatus 1100.

The pair 1801 of training images may include identical or different training objects. In FIG. 18, a human face is used as a training object. However, there is no limitation to the human face, and various objects may be used to form training data.

The pair 1801 of training images may be, for example, a pair of images with identical or different objects. For example, a pair of an image of an A's face #1 and an image of an A's face #2, or a pair of an image of the A's face #1 and an image of a B's face #1 may be formed as the pair 1801. For example, numerals of the same face may indicate different face states (for example, face angles, facial expressions, and the like).

The training information 1809 may be labeled to the pair 1801 of training images. When the pair 1801 of training images includes an identical training object, the training information 1809 of "1" may be labeled to the pair 1801 of training images. When the pair 1801 of training images includes different training objects, the training information 1809 of "−1." may be labeled to the pair 1801 of training images.

Additionally, the pair 1801 of training images may not be limited to those shown in FIG. 18, and may include, for example, a pair of images including identical objects in the same state, a pair of images including identical objects in different states, a pair of images including different objects in the same state, a pair of images including different objects in different states, and the like. A state may include, for example, an expression, a pose, and the like.

According to at least one example embodiment of the inventive concepts, any or all of the units, structures, apparatuses and modules described herein (including, for example, any or all of the deep learning structures 100 and 200, the feature recognition apparatus 400, the feature verification apparatuses 1100 and 1300, and the apparatuses 810 and 1710) may be implemented by one or more circuits or circuitry (e.g., hardware) specifically structured to carry out some or all of the operations described herein as being performed by any or all of the above-referenced units, structures, apparatuses and modules described herein (or an element thereof). According to at least one example embodiment of the inventive concepts, any or all of the above-referenced units, structures, apparatuses and modules described herein may include or be implemented by a memory and one or more processors executing computer-readable code (e.g., software) that is stored in the memory and includes instructions corresponding to some or all of the operations described herein as being performed by any or all of the above-referenced units, structures, apparatuses and modules described herein (or an element thereof). According to at least one example embodiment of the inventive concepts, any or all of the above-referenced units, structures, apparatuses and modules described herein may be implemented by, for example, a combination of the above-referenced hardware and processors executing computer-readable code. For example, the hardware components may include microphones, amplifiers, band-pass filters, audio to digital convertors, and processing devices. A processing device may be implemented using one or more hardware devices configured to carry out and/or execute program code by performing arithmetical, logical, and input/output operations. The processing device(s) may include, for example, one or more processors, a controller and an arithmetic logic unit, a digital signal processor, a microcomputer, a field programmable array, a programmable logic unit, a microprocessor or any other device capable of responding to and executing instructions in a defined manner.

The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules executed by a hardware-implemented processor in order to perform the operations of the above-described example embodiments.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of recognizing a feature of an image, the method comprising:
   receiving an input image including an object;
   performing a filtering of information corresponding to the input image;
   extracting, based on the filtering of information corresponding to the input image, first feature information using a first layer of a neural network, the first feature information indicating a first feature corresponding to the input image among a plurality of first features;
   performing a filtering of the first feature information;
   extracting, based on the filtering of the first feature information, second feature information using a second layer of the neural network, the second feature information indicating a second feature among a plurality of second features, the indicated second feature corresponding to the first feature information; and
   recognizing an element corresponding to the object based on the first feature information and the second feature information,
   wherein the recognizing comprises:
      generating, using the first feature information and the second feature information, a feature vector;
      performing a comparison operation based on the generated feature vector and a reference vector corresponding to each of a plurality of elements; and
      recognizing the element corresponding to the object based on a result of the comparison operation, and
   wherein the second feature information corresponds to a higher level of image complexity than the first feature information.

2. The method of claim 1, wherein the generating comprises:
   generating the feature vector based on values corresponding to all nodes in the first layer and values corresponding to all nodes in the second layer.

3. The method of claim 1,
   wherein the recognizing comprises calculating a feature value corresponding to the element based on weights between nodes included in the neural network.

4. The method of claim 1, wherein the extracting of the first feature information includes performing the filtering of information corresponding to the input image using a filter with a first size, and
   wherein the extracting of the second feature information includes performing the filtering of the first feature information using a filter with a second size.

5. The method of claim 4, wherein the extracting of the first feature information further includes extracting representative values from the information corresponding to the input image.

6. The method of claim 4, wherein the extracting of the second feature information further includes extracting representative values from the first feature information.

7. The method of claim 1, further comprising extracting m-th feature information using an m-th layer of the neural network, the m-th feature information indicating an m-th feature among a plurality of m-th features, the indicated m-th feature corresponding to a combination of the first feature information through the (m−1)-th feature information,
   wherein m is an integer equal to or greater than 3, and
   wherein the recognizing of the element includes recognizing the element based on the first feature information through the m-th feature information.

8. An apparatus for recognizing a feature of an image, the apparatus comprising:
   a memory storing computer-readable instructions; and
   one or more processors configured to execute the computer-readable instructions such that the one or more processors are configured to,
      receive an input image including an object;
      perform a filtering of information corresponding to the input image;
      extract, based on the filtering of information corresponding to the input image, first feature information using a first layer, the first feature information indicating a first feature among a plurality of first feature information, the indicated first feature corresponding to the input image;
      perform a filtering of the first feature information;
      extract, based on the filtering of the first feature information, second feature information using a second layer, the second feature information indicating a second feature among a plurality of second features, the indicated second feature corresponding to the first feature information;
      generating, using the first feature information and the second feature information, a feature vector;
      performing a comparison operation based on the generated feature vector and a reference vector corresponding to each of a plurality of elements; and
      recognize an element corresponding to the object based on a result of the comparison operation,
   wherein the second feature information corresponds to a higher level of image complexity than the first feature information.

9. The apparatus of claim 8, wherein the one or more processors are further configured to,
   extract third feature information using a third layer, the third feature information indicating a third feature among a plurality of third features, the indicated third feature corresponding to the second feature information, and
   recognize the element corresponding to the object based on the first feature information, the second feature information, and the third feature information.

10. A method of learning a feature to recognize an image, the method comprising:
   receiving a training element and a training image associated with a training object; and
   learning a parameter of a recognizer such that the recognizer recognizes the training element from the training image, the recognizer being configured to recognize a plurality of elements based on a result of a comparison operation between a reference vector corresponding to each of the plurality of elements and a feature vector,
   wherein the feature vector is generated from first feature information extracted from an input image using a first layer of a neural network and second feature information extracted, based on the first feature information, using a second layer of the neural network, and wherein the second feature information corresponds to a higher level of image complexity than the first feature information.

11. The method of claim 10, wherein the learning of the parameter of the recognizer comprises:
learning a parameter of the first layer so that first features are extracted from the training image; and
learning a parameter of the second layer so that second features are extracted from at least one of the first features.

12. The method of claim 11, wherein the learning of the parameter of the recognizer further comprises:
learning the parameter of the recognizer such that the recognizer recognizes the training element based on the first features and the second features.

13. The method of claim 11, wherein the learning of the parameter of the recognizer comprises:
calculating a loss corresponding to the training element.

14. The method of claim 13, wherein the recognizer includes the neural network, and
wherein the learning of the parameter of the recognizer further comprises:
learning weights between nodes included in the neural network, based on the loss.

15. An apparatus for learning a feature to recognize an image, the apparatus comprising:
a memory storing computer-readable instructions; and
one or more processors configured to execute the computer-readable instructions such that the one or more processors are configured to,
receive a training element and a training image associated with a training object;
implement a recognizer; and
learn a parameter of the recognizer such that the recognizer recognizes the training element from the training image, the recognizer being configured to recognize a plurality of elements based on a result of a comparison operation between a reference vector corresponding to each of the plurality of elements and a feature vector,
wherein the feature vector is generated from first feature information extracted from an input image using a first layer of a neural network and second feature information extracted, based on the first feature information, using a second layer of the neural network, and
wherein the second feature information corresponds to a higher level of image complexity than the first feature information.

16. A method of verifying a feature of an image, the method comprising:
receiving a first image including a first object;
performing a filtering of information corresponding to the first image;
extracting, based on the filtering of information corresponding to the first image, first feature information using a first layer of a neural network, the first feature information indicating a first feature among a plurality of first features, the indicated first feature corresponding to the first image;
performing a filtering of the first feature information;
extracting, based on the filtering of the first feature information, second feature information using a second layer of the neural network, the second feature information indicating a second feature among a plurality of second features, the indicated second feature corresponding to the first feature information; and
determining, using the first feature information and the second feature information of the first image and first feature information and second feature information associated with a second image, whether the first object of the first image is similar to a second object of the second image,
wherein the second feature information of the first image corresponds to a higher level of image complexity than the first feature information of the first image.

17. The method of claim 16, wherein the determining comprises:
generating a feature vector associated with the first image based on the first feature information and the second feature information of the first image;
generating a feature vector associated with the second image based on the first feature information and the second feature information associated with the second image; and
performing a comparison operation based on the feature vector associated with the first image and the feature vector associated with the second image, and determining whether the first object is similar to the second based on a result of the comparison operation.

18. The method of claim 17, wherein the generating of the feature vector associated with the first image includes generating the feature vector associated with the first image based on feature values calculated based on the first feature information and the second feature information of the first image, and
wherein the generating of the feature vector associated with the second image includes generating the feature vector associated with the second image based on feature values calculated based on the first feature information and the second feature information associated with the second image.

19. The method of claim 16, wherein the extracting of the first feature information includes extracting first feature information associated with the second image, using the first layer, and
wherein the extracting of the second feature information includes extracting second feature information associated with the second image, using the second layer.

20. The method of claim 16, wherein the extracting of the first feature information includes extracting first feature information associated with the second image, using a layer of the neural network that is separated from the first layer, and
wherein the extracting of the second feature information includes extracting second feature information associated with the second image, using a layer of the neural network that is separated from the second layer.

21. An apparatus for verifying a feature of an image, the apparatus comprising:
a memory storing computer-readable instructions; and
one or more processors configured to execute the computer-readable instructions such that the one or more processors are configured to,
receive a first image including a first object;
perform a filtering of information corresponding to the first image;
extract, based on the filtering of information corresponding to the first image, first feature information using a first layer of a neural network, the first feature information indicating a first feature among a plurality of first features, the first feature corresponding to the first image;

performing a filtering of the first feature information;

extract, based on the filtering of the first feature information, second feature information using a second layer of a neural network, the second feature information indicating a second feature among a plurality of second features, the second feature corresponding to the first feature information among; and determine, using the first feature information and the second feature information of the first image and first feature information and second feature information associated with a second image, whether the first object is similar to a second object of the second image, wherein the second feature information of the first image corresponds to a higher level of image complexity than the first feature information of the first image.

22. The apparatus of claim 21, wherein one or more processors are further configured to, generate a feature vector associated with the first image based on the first feature information and the second feature information of the first image, and to generate a feature vector associated with the second image based on the first feature information and the second feature information associated with the second image, compare the feature vector associated with the first image to the feature vector associated with the second image, and determine whether the first object is similar to the second object.

23. The apparatus of claim 21, wherein the one or more processors are further configured to, extract third feature information using a third layer of the neural network, the third feature information indicating a third feature corresponding to the second feature information among third features, determine whether the first object is similar to the second object, based on the first feature information, the second feature information and the third feature information of the first image and based on the first feature information, the second feature information and third feature information associated with the second image.

24. A method of learning a feature to verify an image, the method comprising:

receiving a pair of training images, and training information corresponding to the pair of training images; and learning a parameter of a verifier so that a result of comparing, by the verifier, the training images corresponds to the training information, the verifier being configured to determine whether two input images are similar to each other, using, first feature information extracted from the two input images using a first layer of a neural network, and second feature information extracted using a second layer of the neural network.

25. The method of claim 24, wherein the training information comprises:

information indicating whether or not the training images include identical objects.

26. The method of claim 24, wherein the learning of the parameter of the verifier comprises:

learning a parameter of the first layer such that first features are extracted from each of the training images; and learning a parameter of the second layer such that second features are extracted from the first features.

27. The method of claim 26, wherein the learning of the parameter of the verifier further comprises:

learning the parameter of the verifier such that the verifier outputs the training information based on the first features and the second features corresponding to each of the training images.

28. The method of claim 24, wherein the learning comprises:

calculating a loss corresponding to the training information.

29. The method of claim 28, wherein the verifier includes the neural network, and wherein the learning of the parameter of the verifier further comprises:

learning weights between nodes included in the neural network, based on the loss.

30. An apparatus for learning a feature to verify an image, the apparatus comprising:

a memory storing computer-readable instructions; and one or more processors configured to execute the computer-readable instructions such that the one or more processors are configured to, receive a pair of training images, and training information corresponding to the pair of training images, and learn a parameter of a verifier so that a result of comparing, by the verifier, the training images corresponds to the training information, the verifier being configured to determine whether two input images are similar to each other, using, first feature information extracted from the two input images using a first layer of a neural network, and second feature information extracted using a second layer of the neural network.

* * * * *